(12) United States Patent
Ulyanov

(10) Patent No.: US 8,788,450 B2
(45) Date of Patent: Jul. 22, 2014

(54) SELF-ORGANIZING QUANTUM ROBUST CONTROL METHODS AND SYSTEMS FOR SITUATIONS WITH UNCERTAINTY AND RISK

(75) Inventor: Sergey V. Ulyanov, Moscow (RU)

(73) Assignee: PronetLabs Ltd., Road Town (VG)

( * ) Notice: Subject to any disclaimer, the term of this patent is extended or adjusted under 35 U.S.C. 154(b) by 411 days.

(21) Appl. No.: 13/273,783

(22) Filed: Oct. 14, 2011

(65) Prior Publication Data

US 2013/0096698 A1   Apr. 18, 2013

(51) Int. Cl.
*G06F 15/18* (2006.01)
*G06F 15/00* (2006.01)

(52) U.S. Cl.
USPC .............................................. 706/62; 706/13

(58) Field of Classification Search
CPC combination set(s) only.
See application file for complete search history.

(56) References Cited

U.S. PATENT DOCUMENTS

| | | |
|---|---|---|
| 6,212,466 B1 | 4/2001 | Ulyanov et al. |
| 6,216,083 B1 | 4/2001 | Ulyanov et al. |
| 6,411,944 B1 | 6/2002 | Ulyanov |
| 6,415,272 B1 | 7/2002 | Ulyanov |
| 6,463,371 B1 | 10/2002 | Ulyanov et al. |
| 6,496,761 B1 | 12/2002 | Ulyanov et al. |
| 6,578,018 B1 | 6/2003 | Ulyanov |
| 6,609,060 B2 | 8/2003 | Ulyanov et al. |
| 6,701,236 B2 | 3/2004 | Ulyanov et al. |
| 6,721,718 B2 | 4/2004 | Ulyanov |
| 6,950,712 B2 | 9/2005 | Ulyanov et al. |
| 7,219,087 B2 * | 5/2007 | Panfilov et al. .................. 706/23 |
| 7,251,638 B2 * | 7/2007 | Fujii et al. ........................ 706/23 |
| 7,383,235 B1 * | 6/2008 | Ulyanov et al. .................. 706/13 |
| 8,190,553 B2 * | 5/2012 | Routt ................................ 706/62 |
| 8,265,110 B2 * | 9/2012 | Dantus et al. ..................... 372/25 |
| 8,633,437 B2 * | 1/2014 | Dantus et al. .................. 250/288 |
| 2006/0224547 A1 | 10/2006 | Ulyanov et al. |
| 2008/0140749 A1 | 6/2008 | Amato et al. |

OTHER PUBLICATIONS

Litvintseva et al., "Design of robust knowledge bases of fuzzy controllers for intelligent control of substantially nonlinear dynamic systems: II. A soft computing optimizer and robustness of intelligent control systems", *Journal of Computer and Systems Sciences Internationals*, Vo. 45, No. 5, pp. 744-771 (2006).

Litvintseva et al., "Design of self-organized robust wise control systems based on quantum fuzzy inference", In *Proceedings of World Automation Congress (WAC'2006)*, Jul. 24-26, 2006, pp. 1-7, Budapest, Hungary.

(Continued)

*Primary Examiner* — Michael B Holmes
(74) *Attorney, Agent, or Firm* — Knobbe, Martens, Olson & Bear, LLP

(57) ABSTRACT

Control systems, apparatus, and methods can apply quantum algorithms to control a control object in the presence of uncertainty and/or information risk. A self-organizing controller can include a quantum inference unit that can generate a set of robust control gains for a controller that can meet the control objectives for the particular realization of the control object. In one embodiment, the quantum inference unit can include a quantum correlator configured to generate a plurality of quantum states based on a plurality of controller parameters and a correlation type. In this embodiment, the quantum inference unit can also include a quantum optimizer configured to select the correlation type of the quantum correlator and to select a quantum state from the plurality of the quantum states. The self-organizing controller can control the control object with one or more controller gains that are based on the selected quantum state.

46 Claims, 13 Drawing Sheets

(56) References Cited

OTHER PUBLICATIONS

Litvintseva et al., "Intelligent Control Systems. I. Quantum Computing and Self-Organization Algorithm", *Journal of Computer and Systems Sciences International*, vol. 48, No. 6, pp. 946-984 (2009).

Litvintseva et al., "Quantum Fuzzy Inference for Knowledge Base Design in Robust Intelligent Controllers", *Journal of Computer and Systems Sciences International*, vol. 46, No. 6, pp. 908-961 (2007).

Litvintseva et al., "Soft computing optimizer for robust KB design processes: The Structure and Applications", *World Automation Congress, Fifth International Symposium on Soft Computing for Industry*, Seville, Spain, Jun. 28-Jul. 1, 2004; 7 pages.

Panfilov et al., "Fast algorithm for efficient simulation of quantum algorithm gates on classical computer", *Systemics, Cybernetics and Informatics*, vol. 2, No. 3, pp. 63-68 (2004).

Panfilov, et al., "Soft computing optimizer for intelligent control systems design: The structure and applications", *Systemics, Cybernetics and Informatics*, vol. 1, No. 5, pp. 91-96 (2003).

Porto et al., "Hardware implementation of fast quantum searching algorithms and its application in quantum soft computing and intelligent control", *World Automation Congress, Fifth International symposium on Soft Computing for Industry*, Seville, Spain, Jun. 28-Jul. 1, 2004, 7 pages.

Raikov, Alexander N., "Convergent cognitype for speeding-up the strategic conversation", *Proceedings of the 17th World Congress The International Federation of Automatic Control (IFAC'2008)*, Seoul, Korea, Jul. 6-11, pp. 8103-8108 (2008).

Ulyanov et al., "Computational intelligence with quantum game's approach and robust decision-making in communication information uncertainty", *In Proceedings of International Conf. on Computational Intelligence (ICCI'2004)*, Nicosia, North Cyprus, pp. 172-187 (2004).

Ulyanov et al., "Design of self-organized intelligent control systems based on quantum fuzzy inference: Intelligent system of systems engineering approach", *In Proceedings of IEEE International Conference on Systems, Man and Cybernetics (SMC', 2005)*, Hawaii, USA, vol. 4, pp. 3835-3840 (2005).

Ulyanov et al., "Design technology of robust KB for integrated fuzzy intelligent control based on quantum fuzzy inference: Inverted pendulum as benchmark of quantum fuzzy control in unpredicted control situations", *In Proceedings 4th Intern. Conference on Soft Computing, Computing with Words and Perceptions in System Analysis, Decision and Control (ICSCCW'2007)*, Antalya, Turkey, pp. 218-237 (2007).

Ulyanov et al., "Fast algorithm and HW design for efficient intelligent computation of main quantum algorithm operators on classical computer," *International University of Nature, Society, and Man "Dubna"*, Moscow, Russia, ST Microelectronics, Milan, Italy; vol. 3, No. 3, 28 pages (2008).

Ulyanov et al., "Physical limits and information bounds of micro control. Part 2: Quantum soft computing and quantum searching algorithms", Proceedings of the 1998 International Symposium on Micromechatronics and Human Science; Nagoya, Japan, Nov. 25-28, 1998.

Ulyanov et al., "Quantum swarm model of self-organization process based on quantum fuzzy inference and robust wise control design", *In: Proc. 7th International Conference on Application of Fuzzy Systems and Soft Computing (ICAFS'2006)*, Siegen, Germany, pp. 10-19 (2006).

Ulyanov et al., "Self-organization Robust Knowledge Base Design for Fuzzy Controllers in Unpredicted Control Situations Based on Quantum Fuzzy Inference", *Appl. Comput. Math*, vol. 10, No. 1, Special Issue, pp. 164-174 (2011).

Ulyanov et al., "Self-organization principle and robust wise control design based on quantum fuzzy inference", *In Proceedings of International Conference (ICSCCW'2005)*, Antalya, Turkey, pp. 54-80 (2005).

Ulyanov, S.V., "Quantum fuzzy modeling system: SW&HW support of quantum computational intelligence and intelligent control", *In Proceedings 8th International Conference on Application of Fuzzy Systems and Soft Computing (ICAFS—2008)*, Helsinki, Finland, Sep. 1-3, pp. 169-186 (2008).

Ulyanov, S.V., "Quantum soft computing in control process design: Quantum genetic algorithms and quantum neural network approaches", *In Proc. World Automation Congress—Fifth International Symposium on Soft Computing for Industry (WAC'2004—ISSCI)*, Seville, Spain, vol. 17, pp. 99-104 (2004).

Ulyanov, Sergey V., "Self-Organization of Robust Intelligent Controller Using Quantum Fuzzy Inference", $3^{rd}$ *International Conference on Intelligent System and Knowledge Engineering*, pp. 726-732, vol. 1, Xiamen (2008).

Ulyanov, S.S., "Engineering management of intelligent control systems: Information technologies of KB-Design, creation and protection problems of the intellectual property", *Proceedings of 6th International Conference on Application of Fuzzy System and Soft Computing (ICAFS'2004)*, Sep. 28-30, pp. 98-108, Barcelona, Spain (2004).

Wu et al., "Discrete $H_2/H_\infty$ Nonlinear Controller Design Based on Fuzzy Region Concept and Takagi-Sugeno Fuzzy Framework", *Circuits and Systems I: Regular Papers, IEEE Transactions on Circuits and Systems*, vol. 53, No. 12; pp. 2838-2848 (2006).

\* cited by examiner

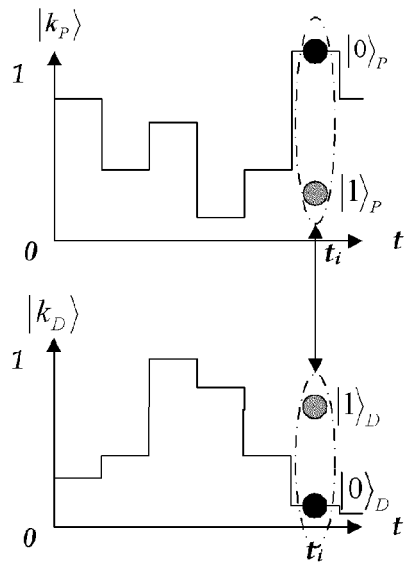
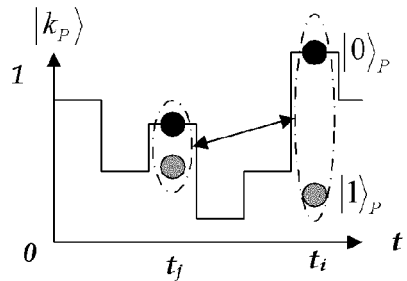
*Fig. 7A*  *Fig. 7B*
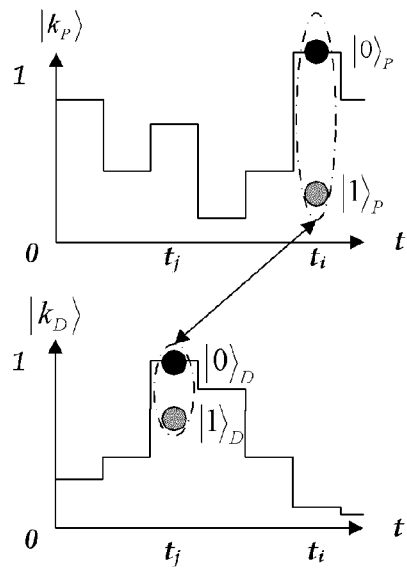
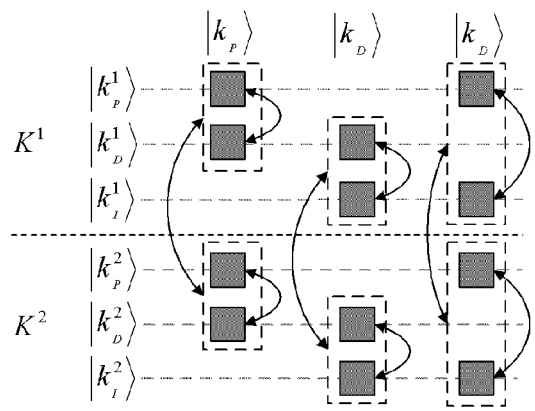
*Fig. 7C*  *Fig. 7D*

SELF-ORGANIZING QUANTUM ROBUST CONTROL METHODS AND SYSTEMS FOR SITUATIONS WITH UNCERTAINTY AND RISK

BACKGROUND

1. Technical Field

The present disclosure relates generally to the field of automatic feedback systems for devices, machines, and systems in the presence of uncertainty and/or risk.

2. Description of the Related Technology

In classical control systems, a linear dynamic model of a control object is obtained in the form of dynamic equations, usually ordinary differential or difference equations. Based on the linear dynamic model, a controller can be designed by assuming the linear dynamic model approximates the control object. Under this approach, the control object is assumed to be relatively linear and time invariant. However, many real control objects can be time varying, strongly nonlinear, and unstable. For example, the dynamic model may include parameters (e.g., masses, inductance, aerodynamics coefficients, etc.) that depend on a changing environment or a state of the dynamic model. If the parameter variation is small and the dynamic model is stable, then a proportional-integral-derivative (PID) controller can be satisfactory.

Modern multivariable control methodologies, such as $H_\infty$ or mixed-$\mu$ controllers synthesis, can account for some degree of uncertainty in the control object's parameters and/or dynamics. Like classic control systems, controller design is based on the assumption that the control object can be sufficiently approximated by a linear dynamic model. For the purpose of controller design, time variations and nonlinearities can be treated as "uncertainty" in the problem formulation. As a result, strongly time-varying and/or nonlinear control objects can result in a linear dynamic model with an unnecessarily large characterization of its uncertainty. However, for sufficiently large uncertainty, there may not be a controller that can stabilize the control object, particularly for all possible forms of uncertainty. Further, the resulting controller, if it exists, can be conservative in the sense that it accounts for the worst case realization of the uncertainty.

There are several nonlinear control techniques, such as feedback linearization, dynamic inversion, sliding mode, nonlinear damping, adaptation (for example, online parameter estimation), or the like. However, there does not appear to be a general nonlinear control methodology that takes into account formal uncertainty and performance requirements.

In quantum computing, classical computers with a Von Neumann architecture can simulate quantum algorithm gates for performing quantum algorithms and computation. A quantum algorithm can be solved using an algorithmic-based approach, wherein matrix elements of the quantum gate are calculated on demand. For example, an implementation of a Grover's search algorithm can be executed on a classic computer.

SUMMARY

The systems, methods and devices of the disclosure each have several innovative aspects, no single one of which is solely responsible for the desirable attributes disclosed herein.

One innovative aspect of the subject matter described in this disclosure can be implemented in a method that includes selecting a correlation type based on a result of a quantum genetic search algorithm. The method can also include generating quantum states based on a plurality of controller parameters and the selected correlation type. In addition, the method can include tuning a controller configured to control a control object based on at least one of the generated quantum states.

In some implementations, selecting can include simulating a closed-loop system to evaluate a candidate correlation type, evaluating a different candidate correlation type when the simulating indicates that fitness requirements are not satisfied, and returning the candidate correlation type as the selected correlation type when the fitness requirements are satisfied. Selecting can be based on evaluating fitness functions associated with different correlation types. The correlation type can include one of a spatial correlation, a temporal correlation, or a spatial-temporal correlation. Alternatively or additionally, the correlation type comprises an external correlation.

The plurality of controller parameters can include a set of controller gains. According to some implementations, generating quantum states can include generating a set of candidate quantum states based on the set of controller gains, and performing a correlation of the selected correlation type on the set of candidate quantum states from which a selected quantum state of the candidate quantum states is identified. In some of these implementations, the method can also include identifying a quantum state having the highest probabilities of the candidate quantum states as the selected quantum state. Alternatively or additionally, the method can include indentifying the selected quantum state by performing Grover's search algorithm.

The method can also include identifying one of the generated quantum states as a selected quantum state, wherein tuning is based on the selected quantum state. The quantum genetic search algorithm can include Grover's search algorithm. The generated quantum states each can include at least one real state and at least one virtual state. Generating the quantum states can provide at least one quantum state associated with a higher probability than any linear combination of the controller parameters. Alternatively or additionally, the controller parameters are based on at least one information risk production rule.

In some instances, the method can include generating two sets of controller gains with one or more proportional-integral-derivative (PID) controllers, wherein the plurality of controller parameters include the two sets of controller gains, and wherein the controller comprises a quantum PID controller.

Another innovative aspect of this disclosure can be implemented in a control system that includes a quantum inference unit configured to provide one or more controller gains to a controller configured to control a control object. The quantum inference unit includes a quantum correlator configured to generate a plurality of quantum states based on a plurality of controller parameters and a correlation type. The quantum inference unit also includes a quantum optimizer configured to select the correlation type of the quantum correlator and to select a quantum state from the plurality of the quantum states. The one or more controller gains are based on the selected quantum state.

The control system of can also include a knowledge base storing at least one of the plurality of candidate controller parameters. The knowledge base can be configured to provide one or more of the plurality of candidate controller parameters to the quantum inference unit. The knowledge base can stores one or more information risk production rules.

The quantum inference unit can also include a quantum encoder configured to generate a plurality of candidate quantum states based on the at least one of the plurality of controller parameters and provide the quantum correlator with the candidate quantum states. The quantum correlator can be configured to generate the plurality of quantum states based on performing a correlation of the selected correlation type on the candidate quantum states.

The quantum inference unit can also include a decoder configured to output the one or more controller gains based on decoding the selected quantum state.

The quantum optimizer can include a quantum search unit configured to perform a superposition operation, an entanglement operation, and an interference operation on the at least one of the plurality of quantum states generated by the quantum correlator. Alternatively or additionally, the quantum optimizer can include a genetic algorithm unit configured to simulate a closed-loop system and select the selected quantum state based on evaluating a fitness function associated with the selected correlation type.

The correlation type can include one of a spatial correlation, a temporal correlation, or a spatial-temporal correlation.

The control system can also include the controller. For instance, the controller can include a proportional-integral-derivative (PID) controller. In some of these instances, the controller includes a fractional PID controller. The controller can include a quantum PID controller configured to tune the control object based, and the plurality of controller parameters can be based on two sets of gains generated by two PID controllers. In some implementations, the controller can include a sliding mode controller.

Another innovative aspect of this disclosure can be implemented in a method that includes generating quantum states based on a plurality of controller parameters. The method can also include executing a quantum search algorithm on the generated quantum states to select a quantum state based on information risk. In addition, the method can include controlling a control object based on an indicator of the selected quantum state.

In some instances, executing is performed on line. Alternatively or additionally, executing can include identifying the selected state when a risk termination condition is satisfied, and generating new quantum states when the risk termination condition is not satisfied.

The method can also include adjusting at least one of the controller parameters based on an information risk production rule.

The information risk can be associated with a current state of a control system that includes the control object. The controller parameters may not be designed to control the control object in the current state of the control system.

The method can also include selecting a correlation type based on a result of performing another quantum search algorithm, wherein generating is based on the selected correlation type. Selecting can be based on evaluating fitness functions associated with different correlation types, in which the fitness functions incorporate information risk.

The quantum search algorithm can be a quantum genetic search algorithm.

Yet another innovative aspect of this disclosure can be implemented in a control system that includes a quantum inference unit configured to provide one or more controller gains to a controller configured to control a control object. The quantum inference unit includes a quantum correlator configured to generate a plurality of quantum states based on a plurality of controller parameters. The quantum inference unit also includes a quantum optimizer configured to select a quantum state from the plurality of the quantum states based on information risk. The one or more controller gains are indicative of the selected quantum state.

The control system can also include a knowledge base storing the controller parameters and one or more information risk production rules. The knowledge base can be configured to provide the one or more controller parameters to the quantum inference unit. The information risk can include the one or more information production rules. The controller parameters can include controller gains, and the knowledge base can be configured to compute the controller gains provided to the quantum inference unit based on a risk estimation signal indicative of information risk.

The quantum genetic optimizer can include a genetic algorithm unit configured to simulate a closed-loop system and select the selected quantum state based on evaluating a fitness function that incorporates information risk.

The quantum inference unit can also include a quantum encoder configured to generate a plurality of candidate quantum states based on the controller parameters and provide the quantum correlator with the candidate quantum states. The quantum correlator can generate the plurality of quantum states based on performing a correlation on the candidate quantum states.

The quantum inference unit can also include a decoder configured to decode the one or more controller gains from the selected quantum state.

The control system of can also include the controller. The controller can include one of a proportional-integral-derivative (PID) controller, a fractional PID controller, and a sliding mode controller.

The quantum inference unit can be a quantum fuzzy inference unit configured for providing one or more controller gains to a fuzzy controller.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIGS. 7A, 7B, and 7C depict example diagrams of spatial correlation, temporal correlation, and spatial-temporal correlation, respectively.

FIG. 7D depicts an example diagram of internal and external correlation types.

DETAILED DESCRIPTION

Figure 1:
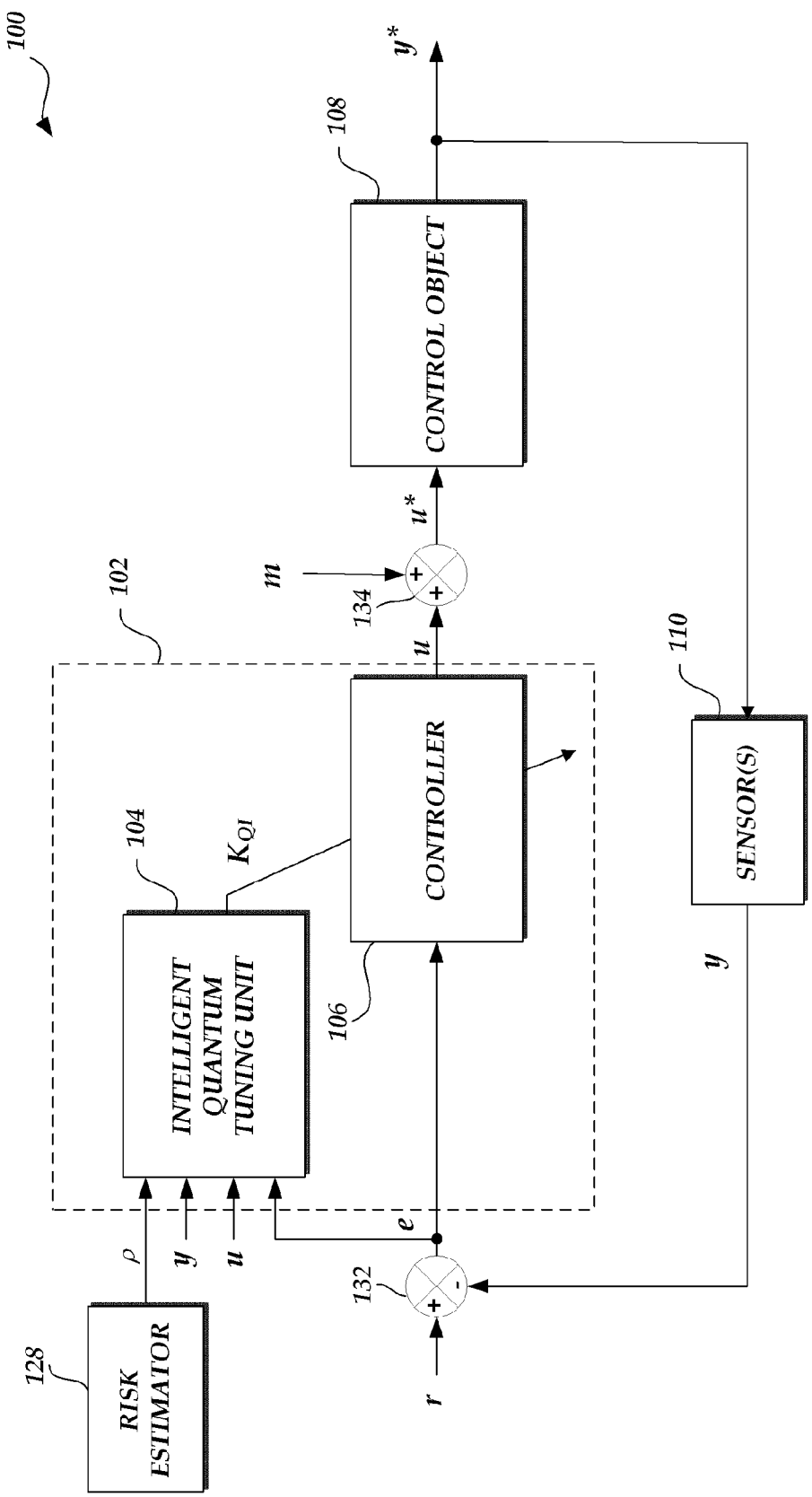
FIG. 1 is a block diagram depicting an illustrative closed-loop system including a self-organizing controller for controlling a control object.

Generally described, aspects of the present disclosure relate to controlling a control object. More specifically, aspects of the present disclosure relate to self-organizing control of an uncertain control object. In some embodiments, a self-organizing controller can include n knowledge bases of candidate controllers and a quantum inference unit. Each of the n knowledge bases can provide a set of candidate controller gains based on online measurements of the control object and/or the environment. The quantum inference unit can perform online processing of the n sets of controller gains of the n knowledge bases to generate a set of robust control gains to tune a controller, in which n is a positive integer. The robust controller gains can be controller gains of a controller that can meet the control objectives for the particular realization of the control object.

The quantum inference unit can generate robust controller gains by processing the n sets of controller gains by using quantum computing operations, including the operations of (i) superposition, (ii) quantum correlations (entanglement), (iii) interference, or any combination thereof. For example, the quantum inference unit can encode each controller gain generated by the n knowledge bases into a quantum state. In some embodiments, the quantum state of a controller gain is a superposition of a real controller state $|0\rangle$ and a virtual controller state $|1\rangle$. The real controller state $|0\rangle$ can correspond to the controller gain generated corresponding to a knowledge base, and a virtual controller state $|1\rangle$ can correspond to a separate control gain (a "virtual gain") computed based on the real controller state $|0\rangle$. Using the real and virtual states as building blocks, the quantum inference unit can correlate two or more of the encoded quantum states to create a superposition signal of correlated states. The superposition signal can be used to determine a robust controller gain. For example, the quantum interference unit can perform an interference operation, which selects a correlated state. For instance, the correlated state can be selected based on having the highest probability. The selected correlated quantum state can be decoded into a controller gain, with which a controller included in a feedback loop with the control object can be tuned to control the control object.

Advantageously, some embodiments of the self-organizing controllers described herein are configured to compensate for uncertainty and/or risk that not accounted for by any of the n individual knowledge bases. For example, the quantum inference unit can compress redundant data and/or extract hidden data from the n knowledge bases. Data can be compressed and/or extracted by utilizing real and virtual gains, correlating and/or superposing various controller quantum states, and extracting a state from the superposition of correlated quantum states. In this way, the quantum inference unit can combine features of the each independent knowledge base and/or generate a robust controller gain for a situation not addressed by any individual knowledge base by extracting information from the collection of knowledge bases. Non-limiting examples of such situations include, for example, component aging, sensor failure, and the like.

The controllers described herein can be generated and/or tuned automatically offline and/or online. For example, a correlation type can be selected from a variety of correlation types. The correlation type used by such a self-organizing controller can effect performance, and the optimal correlation type can be problem dependent. Factors that can influence the optimal selection of the correlation can include the characteristics of the control object, the control objectives and/or constraints, the environment, the like, or any combination thereof. Moreover, some of these factors can change over time. These changes can be drastic. Thus, online tuning can be beneficial. Alternatively or additionally, the self-organizing controller can use risk estimation to alter its behavior. Utilizing risk estimation can improve robustness to uncertainty.

Self-organizing control can include any combination of features or quantum/genetic algorithms disclosed in U.S. patent application Ser. No. 11/313,077, filed Dec. 20, 2005, titled "METHOD AND DEVICE FOR PERFORMING A QUANTUM ALGORITHM TO SIMULATE A GENETIC ALGORITHM," and published as U.S. Patent Publication 2008/0140749 on Jun. 12, 2008, which is hereby incorporated by reference in its entirety. Additionally, self-organizing control can include any combination of features of quantum and/or genetic algorithms disclosed in U.S. patent application Ser. No. 09/979,348, filed Jan. 23, 2002, titled "METHOD AND HARDWARE ARCHITECTURE FOR CONTROLLING A PROCESS OR FOR PROCESSING DATA BASED ON QUANTUM SOFT COMPUTING," and issued as U.S. Pat. No. 7,383,235 on Jun. 3, 2008, which is hereby incorporated by reference in its entirety.

Self-organizing control based on soft computing and quantum computing techniques can be implemented on a quantum computer or simulated, for example, using classical efficient simulation methods of quantum algorithms on computers with a classical architecture, such as a von Neumann architecture.

FIG. 1 shows an example closed-loop system 100 that includes a control object 108, a self-organizing controller 102 having an intelligent quantum tuning unit 104 and a controller 106, one or more sensors 110, a risk estimator 128, a comparator 132, and a summer 134. The closed-loop system 100 can control the control object 108 in the presence of uncertainty and/or risk. The closed-loop system 100 is one example of a control system.

The control object 108 can be referred to as "a plant" or "a process" in control theory literature. The control object 108 can be a system having relationships between certain inputs u* and certain outputs y*, in which it is desired that the outputs y* satisfy control objectives. Non-limiting examples of a control object 108 can include a temperature controller configured to control a temperature of a room, a vehicle such as an aircraft, a robotic system, one or more computing systems configured to control data traffic over a communication network, a medical device such as a prosthesis, a biological system such as a genetically-modified bacteria, and the like. Example inputs u* in a control system that includes an aircraft as a control object can include signals to motors that deflect movable surfaces and/or flaps on the aircraft's wings and/or tail and/or signals to affect throttle settings. Example outputs y* of an aircraft can include the aircraft's position, velocity, orientation, rate of rotation, the like, or any combination thereof.

The input-output relationships of the control object 108 can be dynamic relationships. For instance, the outputs y* can be generated based on past outputs and/or past inputs in real-time. The dynamics of the control object 108 can be unstable, for example, small perturbations of the inputs u* and/or states of the control object 108 can lead to large perturbations in the states of the control object 108 that do not dampen out with time. For example, a high-performance aircraft can be dynamically unstable and thus require constant or near constant adjustment of the aircraft's control surfaces, flaps, and engine throttle to maintain stable flight. Additionally, the dynamics of control objects, such as an aircraft, can be nonlinear. Nonlinear dynamics can lead to instabilities that grow more rapidly than instabilities in systems with linear dynamics. Moreover, some control objects that have nonlinear dynamics behave differently with operation conditions. For example, an aircraft can behave quite differently at low speeds and low altitudes than at high speeds and high altitudes.

When a control object exhibits unsatisfactory dynamics (for example, instabilities and/or nonlinearities), the controller 106 can generate a control signal to adjust the output y* within a suitable predefined range. For instance, in the closed-loop system 100 of FIG. 1, the controller 106 can receive an error signal e from the control object 108 and provide the control object 108 a control signal u that is generated based on the error signal e. The error signal e can represent a tracking error that can measure a difference between a reference signal r (for example, the desired values of outputs y* of the control object 108) and measurements y. In this case, the controller 106 can generate the control signal u to adjust the error signal e to a sufficiently small value. In some implementations, the controller 106 can independently receive the reference signal r and the measurements y. These implementations can allow for the integration of a feed forward controller.

The controller 106 can provide a control signal u to the control object 108 to cause desired dynamic behavior that achieves one or more of the control objectives. Control objectives can include maintaining stability and/or achieving a specified level of performance, in terms of output tracking, disturbance rejection, the like, or any combination thereof. Performance can be specified by one or more of a number of metrics. Table 1 shows non-limiting example performance measures that can be included as part of the control objectives. Alternatively or additionally, performance can be quantified according to $H_\infty$ loop-shaping techniques and/or can be quantified as being a function of one or more of the following: rise time, settling time, overshoot, the error signals and their integral norms, control signals and their integral norms, pole locations, and the like. Further, control objectives can include constraints on, for example, the control signal and/or the states of the control object.

TABLE 1

Criteria of control quality Performance Measure

Integral of squared-error:
$$ISE = \int_0^T e^2(t)dt$$

Integrated absolute error:
$$IAE = \int_0^T |e(t)|dt$$

Integrated of time-absolute-error:
$$ITAE = \int_0^T t|e(t)|dt$$

Integrated of time-squared-error:
$$ITSE = \int_0^T te^2(t)dt$$

One challenge of control system design is achieving the control objectives in the presence of uncertainty. In control system design, there can be a tradeoff between achievable performance and robustness to uncertainty. For instance, increasing the performance of the closed-loop system can typically decrease robustness to uncertainty. Uncertainty can be associated with the control object, the environment, control objectives, the like, or any combination thereof. Control object uncertainty can include uncertainty in the parameters of the control object (for example, mass of the aircraft), in the dynamics of the control object (for example, unmodeled flexible modes of the wings of the aircraft), due to variations of dynamics over time (for example, due to component wear and/or fatigue), due to failures and damage (for example, sensor and/or actuator failures), the like, or any combination thereof. Environmental uncertainty can include uncertainty in stochastic disturbances acting on the control object (for example, wind turbulence), sensor noise, sensor and/or actuator delays, the like, or any combination thereof. Control objective uncertainty can include uncertainty in a reference signal, changes in the control objectives after, for example, failures or faults (for example, after sustaining battle damage, an aircraft flight controller may relax its performance requirements in order to avoid aggressive maneuvers that may further damage the aircraft), the like, or any combination thereof.

A second challenge in control system design is compensating for risk by adjusting the controller gains, controller structure, control objectives, the like, and combinations thereof. Risk can include an occurrence of certain risk conditions and/or an information risk increment. Examples of risk conditions include, for example, actuator failure (such as an engine-out), severe environmental conditions (such as icing), hostile combat conditions, unreliable sensor measurements, and the like. The information risk increment can indicate the expected harm in relying on given information. For example, given a controller designed for a certain linear model of the control object, the information risk associated the controller can be the expected harm in using the control signal generated by the controller. Information risk increment can be based on the probability of a condition (for example, a probability that the controller is destabilizing), the expected loss if the harm occurs, observations (for example, sensor measurements), the like, or any combination thereof. When the information risk increment is large, it can be desirable to change the control structure and/or controller gains. Where the information risk increment is small, it can be desirable to utilize the controller. More detail regarding generating an estimate of the risk will be discussed below.

Because of tradeoffs between performance and robustness in situations with large uncertainty and/or information risk, conventional controllers may not be able to achieve satisfactory performance and/or stability for a number of variations of the uncertainty. A set of candidate controllers may be able to satisfy the control objectives in one or more of the number of variations of the uncertainty that conventional controls may not be able to achieve satisfactory performance and/or stability. If the set of candidate controllers can be constructed, a system can be configured to select a desired candidate controller online.

However, it may be difficult to construct the set of candidate controllers offline and/or online. First, the range of uncertainty may not be known. For example, in the context of an aircraft control object, it may be difficult to predict all variations of possible failure cases. Second, even if the range of uncertainty is known, it may be practically infeasible to design a set of candidate controllers to covers all possible realizations of the uncertainty.

To compensate for uncertainty and/or risk, an intelligent quantum tuning unit can construct and/or tune a controller by extracting knowledge from online data and from one or more knowledge bases. Knowledge bases can provide information concerning a specific subject matter. Examples of knowledge bases include controllers that provide information related to achieving the control objectives for the given measurements and for a certain realization of uncertainty. If there is a set of n candidate controllers, where n is a positive integer, a tuning unit can tune and/or construct a controller based on the combined outputs of n candidate controllers.

Referring back to FIG. 1, the control object 108 can receive inputs u* and generate outputs y*. The inputs u* can represent the true inputs received by the control object 108. Thus, inputs u* can be based on the control signal u and exogenous disturbances m. FIG. 1 depicts an example in which the control signal u and exogenous disturbances m combine additively via summer 134 to generate inputs u*. However, in other implementations, the control signal u and exogenous disturbance m may affect the control object 108 differently. For example, the control signal u and the exogenous disturbances m can affect the control object 108 through separate input channels. Alternatively or additionally, there may be a delay associated with a path from control signal u to the input u*.

Outputs y* can be detected and/or measured by one or more sensors 110 to generate measurements y, which can be provided to the self-organizing controller 102. The sensor(s) 110 may be noisy and/or have time delays. The self-organizing controller 102 can receive a risk estimation signal p, a control signal u, an error signal e, or any combination thereof. In other implementations, the control signal u can be obtained internally within the self-organizing controller 102 because the self-organizing controller 102 can generate the control signal u. The self-organizing controller 102 can generate the control signal u to influence the control object 108 in a way that satisfies the control objectives, even in the presence of uncertainty and/or risk.

The risk estimation signal ρ can indicate an occurrence of certain risk conditions and/or an information risk increment Δρ. Risk conditions can include events such as severe structural damage, sensor failure, actuator failure, the like, or any combination thereof. In connection with information risk increment, information divergence between probability density functions can be represented by a Kullback-Leibler information measure:

$$I(p:\tilde{p}) = \int\int p(x,\theta)\ln\frac{p(x,\theta)}{\tilde{p}(x,\theta)}dxd\theta \quad \text{(Equation 1)}$$

For defined loss functions $W(\tilde{W})$ and probability density functions $p(x,\theta)[\tilde{p}(x,\theta)]$ the average information risk can be computed by the following equation:

$$r(W^2)(\tilde{r}(\tilde{W}^2))=\iint W^2 p(x,\theta)dxd\theta(\iint \tilde{W}^2\tilde{p}(x,\theta)dxd\theta) \quad \text{(Equation 2)}$$

Then information the risk increment $\Delta\rho=\tilde{r}-r$ can be represented by the following equation:

$$-\sqrt{r(W)^2 2I(\tilde{p}:p)} \le (\Delta\rho = \tilde{r}-r) \le \sqrt{\tilde{r}(W^2)2I(p:\tilde{p})} \quad \text{(Equation 3)}$$

In some models of control objects, a structure can be represented as a set of random parameters $x=(x_1,\ldots,x_n)$ in the presence of a disturbed parameter θ. For an experimental (in a statistical sense) vector of random values $x=(x_1,\ldots,x_n)$, the disturbed parameter θ can be represented by a probability density function of model parameters $\tilde{p}(x,\theta)$, which can approximate unknown (in general case) $p(x,\theta)$. The function $p(x,\theta)$ can represent the probability of an unpredicted situation. The function $\tilde{p}(x,\theta)$ can represent the approximated estimation of the unpredicted control situation. An output of the risk estimator 128 can be estimated, for example, by Equation 3 using Equation 1 for information divergence, using the probability density functions $p(x,\theta)$ and $\tilde{p}(x,\theta)$. The probability density functions $p(x,\theta)$ and $\tilde{p}(x,\theta)$ can be generated from corresponding Fokker-Planck-Kolmogorov equations, for example, as described in S. V. Ulyanov, M. Feng, V. S. Ulyanov, K. Yamafuji, T. Fukuda and F. Arai, Stochastic analysis of time-invariant non-linear dynamic systems. Part 1: The Fokker-Planck-Kolmogorov equation approach in stochastic mechanics, Probabilistic Engineering Mechanics, Vol. 13, Issue 3, July 1998, pp. 183-203, which is hereby incorporated by reference in its entirety. For example, the solution of a corresponding Fokker-Planck-Kolmogorov equation for a linearized model of a control object can give $p(x,\theta)$ and a real nonlinear model can give $\tilde{p}(x,\theta)$. The risk estimator 128 can estimate the information risk increment Δρ of uncertainty from linearization methods, for example, using Equation 3.

The risk estimation signal ρ can be generated by the risk estimator 128 and/or by the self-organizing controller 102. In some embodiments, the risk estimation signal ρ can be generated at the direction of a human operator, a vehicle health monitoring system, a weather monitoring system, a high-level mission planner, the like, or any combination thereof. For example, such systems can provide information regarding the occurrence of certain risk conditions. Further, the risk estimation signal ρ can be generated based on monitoring. For instance, the risk estimation signal ρ can be generated based on a performance measure, for example, one of the performance measures in Table 1. As such, the actual performance of the controller 106 can be monitored in real-time. Detection of poor performance can cause the self-organizing controller 102 to take precautionary and/or emergency action (for example, relax performance requirements, use minimal control effort, the like, or any combination thereof). The risk estimation signal p can be based at least partly on Equations 1-3.

As illustrated in FIG. 1, the error signal e can be generated by a comparator 132 configured to subtracts measurements y from the reference signal r. The reference signal r can represent the desired value of the output y*. The reference signal r can be generated by an exogenous system, which can be referred to as "a reference generator" in the control literature. The exogenous system can include a human (for example, a pilot) and/or an outer control loop (for example, a guidance system). The error signal e can represent the quality of control, in which small values of the error signal e can represent a good quality of control.

The self-organizing controller 102 can include an intelligent quantum tuning unit 104 and a controller 106. The intelligent quantum tuning unit 104 can generate robust controller gains $K_{QI}=[k_{QI,1} \ldots k_{QI,n_C}]^T$ (where $n_C$ can represent the number of tunable controller parameters of controller 106) based on the risk estimation signal ρ, the measurements y, the control signal u, the error signal e, or any combination thereof. The robust controller gains $K_{QI}$ can tune the controller 106.

Figure 2A:
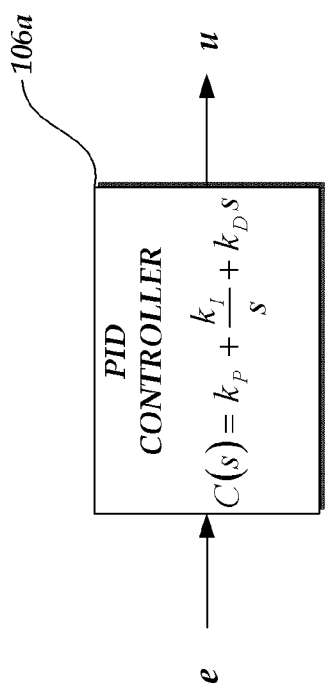
FIGS. 2A and 2B are block diagrams of examples of the controller of FIG. 1 that are proportional-integral-derivative (PID) controllers.
Figure 2B:
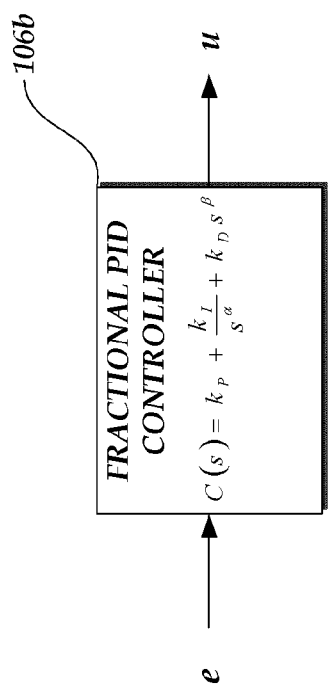

The controller 106 can be implemented in a variety of ways. FIGS. 2A and 2B are block diagrams illustrating examples in which the controller 106 is a proportional-integral-derivative (PID) type controller 106a, 106b. FIG. 2A shows an example PID controller 106a. A PID controller can process the error signal e and generate the control signal u based on the error signal e, an integral functional of the error signal e, a derivative functional of the error signal e, or any combination thereof. For example, the PID controller 106a can generate the control signal u according to following the time-domain equation:

$$u(t) = k_P e(t) + k_I \int_0^t e(\tau)d\tau + k_D \frac{d}{dt}e(t) \qquad \text{(Equation 4)}$$

The controller 106a can generate the control signal u according to the following Laplace domain equation:

$$U(s) = k_P E(s) + \frac{k_I}{s} E(s) + k_D s E(s) \qquad \text{(Equation 5)}$$
$$= \underbrace{\left(k_P + \frac{k_I}{s} + k_D s\right)}_{C(s)} E(s)$$

In Equations 4 and 5, controller gain $k_P$ can represent a proportional gain; controller gain $k_I$ can represent an integral gain; controller gain $k_D$ can represent a derivative gain; U(s) and E(s) can represent the Laplace transform of the time-domain signals u(t) and e(t), respectively; and C(s) can represent the transfer function of the controller. Equation 5 does not include initial conditions for ease of description.

The controller gains $k_P$, $k_I$, and $k_D$ can each vary, for example, as a function of time, operation conditions, exogenous signals, or any combination thereof. For example, the controller gains $k_P$, $k_I$, and $k_D$ of the self-organizing controller 102 can vary according to the robust controller gains $K_{QI}$. For example, the robust controller gains $K_{QI}$ can be a vector signal comprising the signals $k_P$, $k_I$, and $k_D$. The robust controller gains $K_{QI}$ can be represented by the following equation:

$$K_{QI}(t)=[k_P(t)k_I(t)k_D(t)]^T \qquad \text{(Equation 6)}$$

In Equation 6, $[\ ]^T$ can represent the vector-transpose operator.

Due to practical considerations, in some embodiments the PID controller 106a may not be implemented with pure integration or derivative action. For example, the integrator may be modified to include anti-windup, saturation, leakage, or any combination thereof. In some embodiments the derivative operator can be implemented with a "dirty derivative", such as a realizable filter configured to approximate a derivative operator for certain operation conditions (for example, over a particular frequency range).

Some implementations of the controller 106 of the self-organizing controller 102 include a filter structure based on integer powers of the Laplace independent variable s (or z-transform independent variable z for discrete-time filters), although other implementations do not include such a filter structure. For instance, FIG. 2B shows an example fractional-PID controller 106b that utilizes fractional powers of s. The fractional-PID control 106b can generate the control signal u based on the error signal e according to the following equation:

$$U(s) = k_P E(s) + \frac{k_I}{s^\alpha} E(s) + k_D s^\beta E(s) \qquad \text{(Equation 7)}$$
$$= \underbrace{\left(k_P + \frac{k_I}{s^\alpha} + k_D s^\beta\right)}_{C(s)} E(s)$$

In Equation 7, α and β can have non-integer values. In one example, α=0.5 and β=0.5. Robust controller gains $K_{QI}$ can be a vector signal comprising the signals $k_P$, $k_I$, and $k_D$, for example, as described earlier in Equation 6.

Figure 2C:
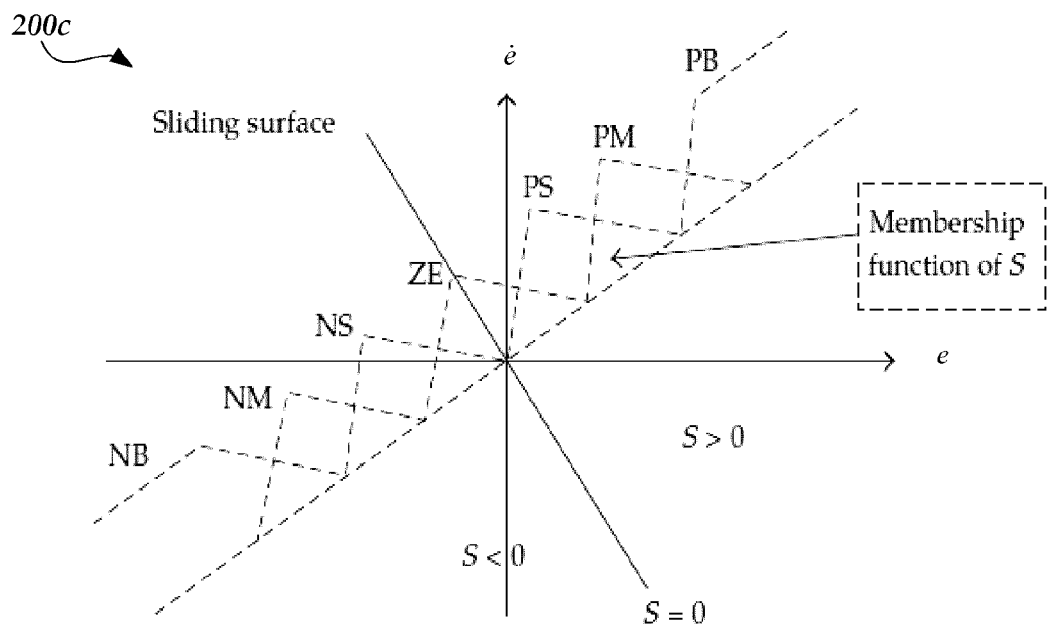
FIG. 2C is a graph illustrating a membership function for a sliding surface.
Figure 2D:
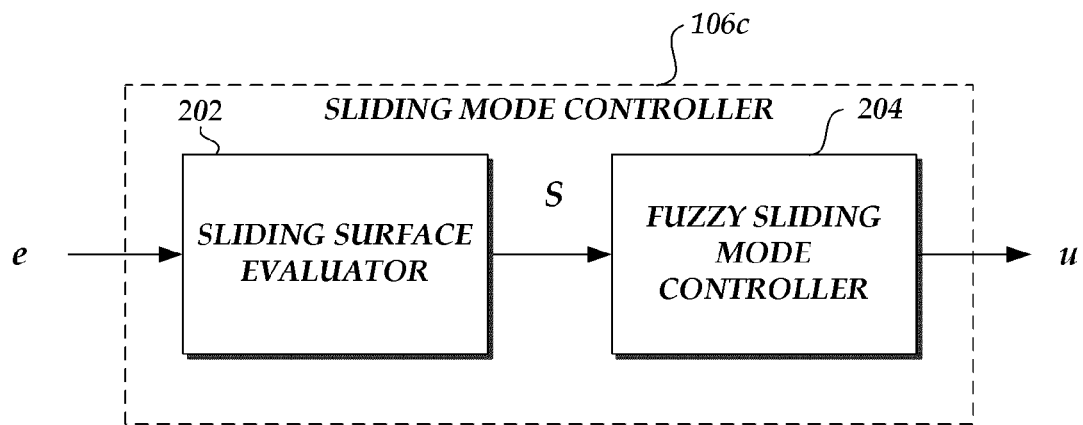
FIG. 2D is a block diagram of an example controller of FIG. 1 that is a sliding mode controller that can control the control object based on the relationships illustrated in FIG. 2C.

The controller 102 of the self-organizing controller can include a nonlinear controller. For example, FIG. 2D depicts the controller 106 of FIG. 1 as sliding mode controller 106c. The sliding mode controller 106c can include a sliding surface evaluator 202 and a fuzzy sliding mode controller 204. FIG. 2C shows an example sliding mode surface S=0 and an example set of fuzzy membership functions of the fuzzy sliding mode controller 204. In this example the surface signal can be represented by the following equation:

$$S(e,\dot{e})=ae+\dot{e} \qquad \text{(Equation 8)}$$

In Equation 8, a>0 can be a design constant. On the sliding surface S=0, the error signal e(t) can evolve according to the dynamics $\dot{e}=-ae$. Therefore, the error signal e can converge exponentially to zero, as desired, where the constant a controls the rate of convergence.

The design problem then becomes driving the error signal e and its derivative $\dot{e}$ onto the sliding surface S=0. This can be accomplished by including a nonlinear component in the control law that has a discontinuity at S=0 so that the vector fields of the half spaces S>0 and S<0 both point towards S=0 in a way that causes the sliding surface to be reached in finite time and a sliding mode to occur along S=0. For example, the control law can include a nonlinear component of the form $-k_{SM} \text{sgn}(S)$, where $\text{sgn}(\cdot)$ represents the signum function.

As illustrated in FIG. 2C, the nonlinear control component can be calculated using fuzzy membership functions NB, NM, NS, ZE, PS, PM, and PB. One advantage of this approach can be that the chattering phenomenon associated with a discontinuous control signal can be avoided. Chattering can lead to instabilities by exciting high-frequency unmodeled dynamics. And as a practical concern, chattering can lead to excessive actuator wear.

Another advantage of using fuzzy membership functions can be that increasing gains $-k_{SM} \text{sgn}(S)$ can be used as error signal e increases beyond specified limits (for example, the NB and PB regions shown in FIG. 2C). One way that this is beneficial is that if the error signal e escapes past predefined limits it can be momentarily pushed with a greater magnitude towards a region within the limits, thereby preventing the error signal e from growing even larger. This can be advantageous for an application in which the control object's states should be kept within a prescribed neighborhood of a desired region. For example, when controlling a vehicle it may be desirable to ensure that error signal e does not exceed some distance; otherwise the vehicle (i.e., the control object) may crash into an obstacle.

Utilizing this sliding mode behavior, a sliding mode controller 106c is shown in FIG. 2D as an example implementation of the controller 106 in FIG. 1. In certain implementations, a sliding surface evaluator 202 can generate a surface signal S as a function of the error signal e and provide the surface signal S to an input of the fuzzy sliding mode controller 204. In some implementations, the sliding surface evaluator 202 can generate a surface signal S as a function of the derivate of the error signal e. Based on the value of the surface signal S, the fuzzy sliding mode control 204 can generate the control signal u to drive the error signal e and its derivatives onto the sliding surface S=0 in a finite time, and then maintain the error signal e and its derivatives on the sliding surface S=0. The fuzzy sliding mode controller 204 can include controller gains that are generated by fuzzy membership functions.

There are a number of types of controllers. For example, the controller 106 can be a classical linear controller, such as a proportional-integral-derivative (PID) controller, a lead-lag compensator, or the like. Moreover, the controller 106 can be a modern linear controller, such as an optimal linear quadratic Gaussian controller, a multivariable robust controller (for example, $H_\infty$ or mixed-$\mu$ controllers), or the like. Further, the controller 106 can be a nonlinear controller, such a controller based on feedback linearization, dynamic inversion, sliding mode, nonlinear damping, adaptation (for example, online parameter estimation), or the like. In addition to being one of above-mentioned types of controllers, the controller 106 can include a combination of two or more types of controller types. For instance, a nonlinear sliding mode controller can include a linear PID-controller component.

Each of these types of controllers can include a number of control parameters that determine the controller's input-output relationship. For example, the control parameters of a PID controller can include a proportional gain $k_P$, integral gain $k_I$, and derivative gain $k_D$. Thus, PID controller design can be viewed as the selection of those three gains such that the control objectives are satisfied.

Figure 3A:
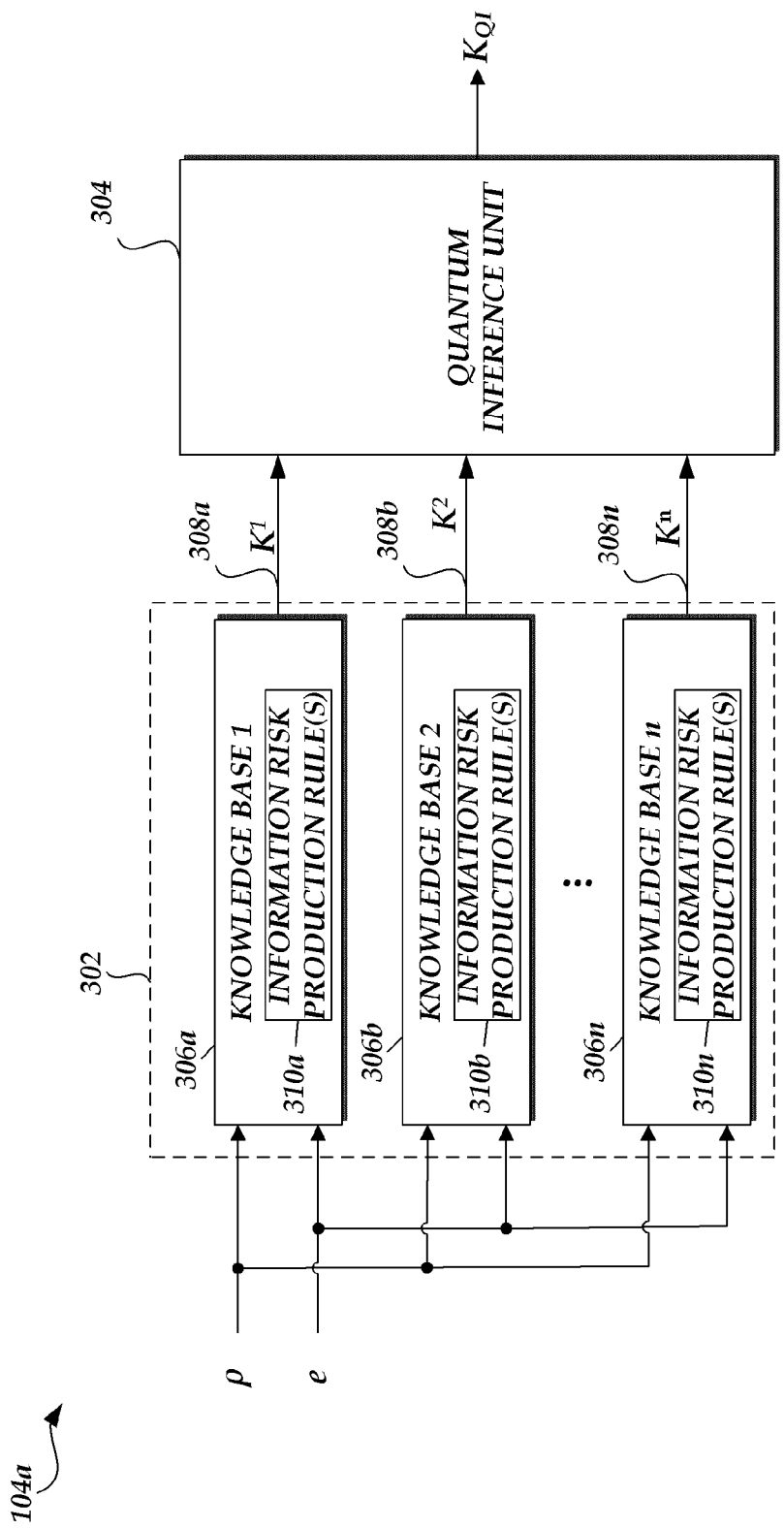
FIG. 3A depicts an example block diagram of the intelligent quantum tuning unit of FIG. 1 according to an embodiment.

FIG. 3A depicts an illustrative block diagram of the intelligent quantum tuning unit 104a for tuning the parameters of a controller. For instance, the intelligent quantum tuning 104a is an example of the intelligent quantum tuning unit 104 of FIG. 1 configured to tune the parameters of the controller 106. The intelligent quantum tuning unit 104a can include a robust knowledge base 302 and a quantum inference unit 304. The robust knowledge base 302 can receive the risk estimation signal $\rho$ and/or the error signal e and generate n sets of controller gains $K^1$-$K^n$, in which n is a positive integer. Each of the n sets of controller gains $K^1$-$K^n$ can correspond to controller gains that can achieve the control objectives for a certain realization of the uncertainty. The n sets of controller gains can be provided to the quantum inference unit 304. The quantum inference unit can be configured to generate the robust controller gain $K_{QI}$ to tune the controller 106.

The robust knowledge base 302 can include n knowledge bases 306a-306n to generate the n sets of controller gains $K^1$-$K^n$. The input to each of the n knowledge bases 306a-306n can include the risk estimation signal $\rho$ and/or the error signal e. The output of the $i^{th}$ knowledge base includes the $i^{th}$ set of controller gains $K^i$.

Knowledge bases 306a-306n can generate suitable gains for a certain realization of the uncertainty given an online error signal (based at least partly on measurements y). In some embodiments, one or more of the knowledge bases 306a-306n can be developed using fuzzy, neural, fuzzy-neural, or the like techniques. However, knowledge bases 306a-306n can be developed using any suitable control design methodology to produce reliable sets of controller gains. For example, n sets of gains can be developed using traditional gain-scheduling techniques based on n models of the control object 108.

With continued reference to FIG. 3A, the knowledge bases 306a-306n can include information risk production rules 310a-310n, respectively. The information risk production rules 310a-310n can represent how the risk estimation signal p affects the computations of controller gains $K^1, K^2, \ldots, K^n$. For example, increased levels of information risk can adjust the controller gains $K_i$ in order to avoid instabilities. Similarly, in some embodiments decreased levels of information risk can adjust the controller gains $K^i$ in order to avoid instabilities.

The quantum inference unit 304 can receive the n sets of controller gains $K^1$-$K^n$ for the knowledge base 302 and generate the robust controller gain $K_{QI}$. The intelligent quantum tuning unit 104 can tune the controller 106 based on the robust controller gain $K_{QI}$. More details of the quantum inference unit 304 are provided below, for example, in connection with FIGS. 4-10.

Figure 3B:
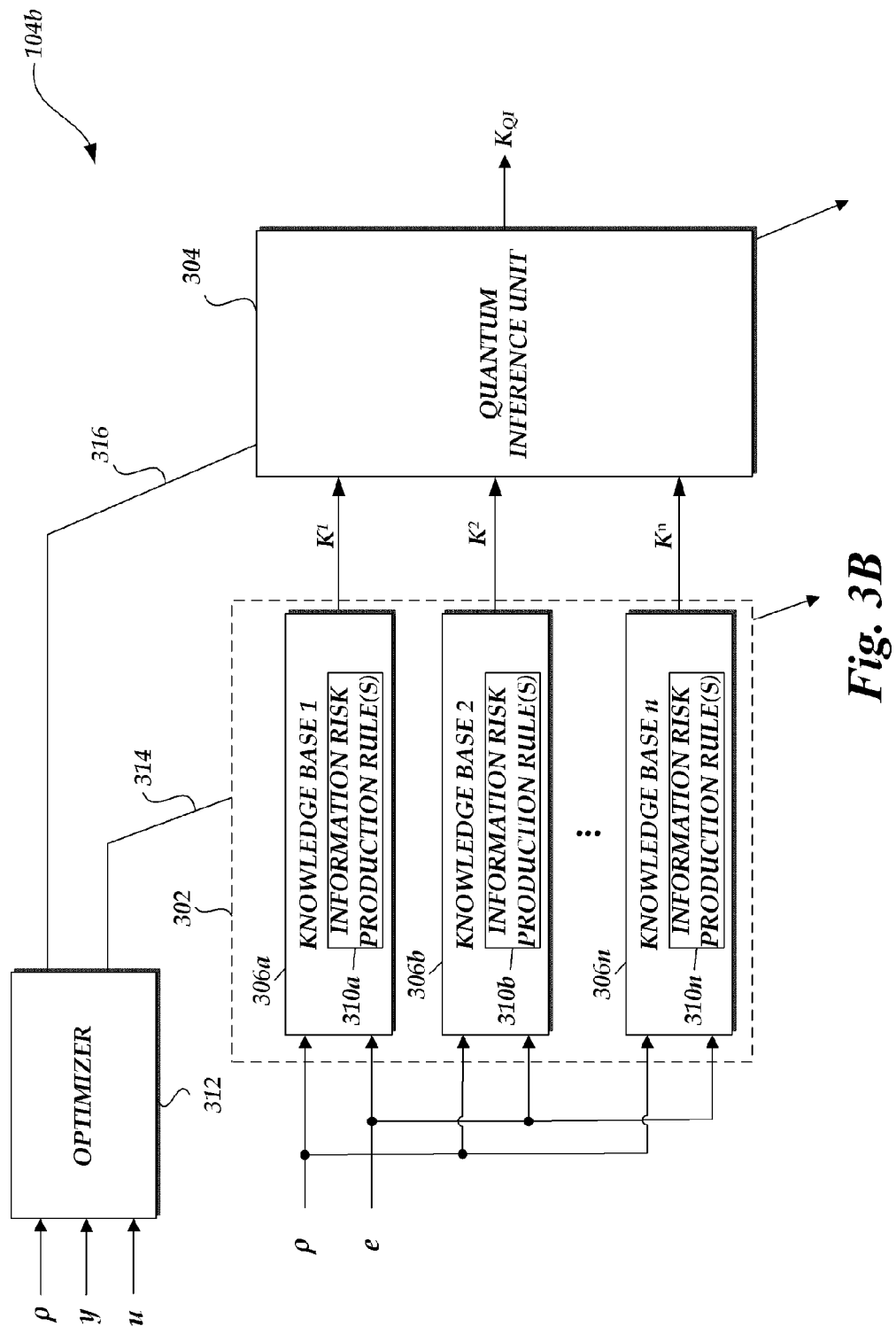
FIG. 3B depicts an example block diagram of the intelligent quantum tuning unit of FIG. 1 according to another embodiment.

FIG. 3B depicts an illustrative block diagram of the intelligent quantum tuning unit of FIG. 3A in combination with an optimizer 312. Otherwise like elements in FIG. 3B can be substantially the same as like elements in FIG. 3A. The optimizer 312 can receive the risk estimation signal $\rho$, the measurements y, and the control signal u. The optimizer 312 can output one or more signals that can create and/or tune elements of the robust knowledge base 302 and/or the quantum inference unit 304. For example, in some embodiments, the optimizer 312 can determine the number of knowledge bases and/or the number and/or shapes of the membership functions implemented by each of the n knowledge bases 306a-306n. In some embodiments the optimizer may also determine certain parameters of the quantum inference unit 304, such as a correlation type, for example, as discussed later in more detail in connection with FIG. 9.

In some embodiments, the optimizer 312 is used offline. For example, the optimizer 312 can be a design tool used to develop the self-organizing controller 102. The optimizer 312 can include soft and/or quantum computation based optimizers. Further, in some embodiments, the optimizer 312 can be used online to adjust the intelligent quantum tuning unit 104. This mode of operation can be useful to optimize controller performance, for example, in the presence of drastic failures. For instance, it may be desirable to adjust the robust knowledge base 302 and/or the quantum inference unit 304 in response to a sensor failure. Accordingly, in some embodiments, the risk estimation signal p and/or other exogenous signals can cause the optimizer 312 to perform one or more optimization routines. This mode of operation can be advantageous in situations when it would be infeasible to run the optimizer 312 continuously or at set periods.

In some embodiments, it is difficult and/or impractical to use the optimizer 312 with the actual control object 108. Thus, in some embodiments the control object 108 used during the design and/or tuning phase is an experimental and/or simulation model of the actual control object. For example, the self-organizing controller 102 can be designed with software by using MATLAB/Simulink® models of the dynamics of the actual control object, and then the results of the optimizer 312 are used to program a processor capable of controlling the actual control object.

Figure 4:
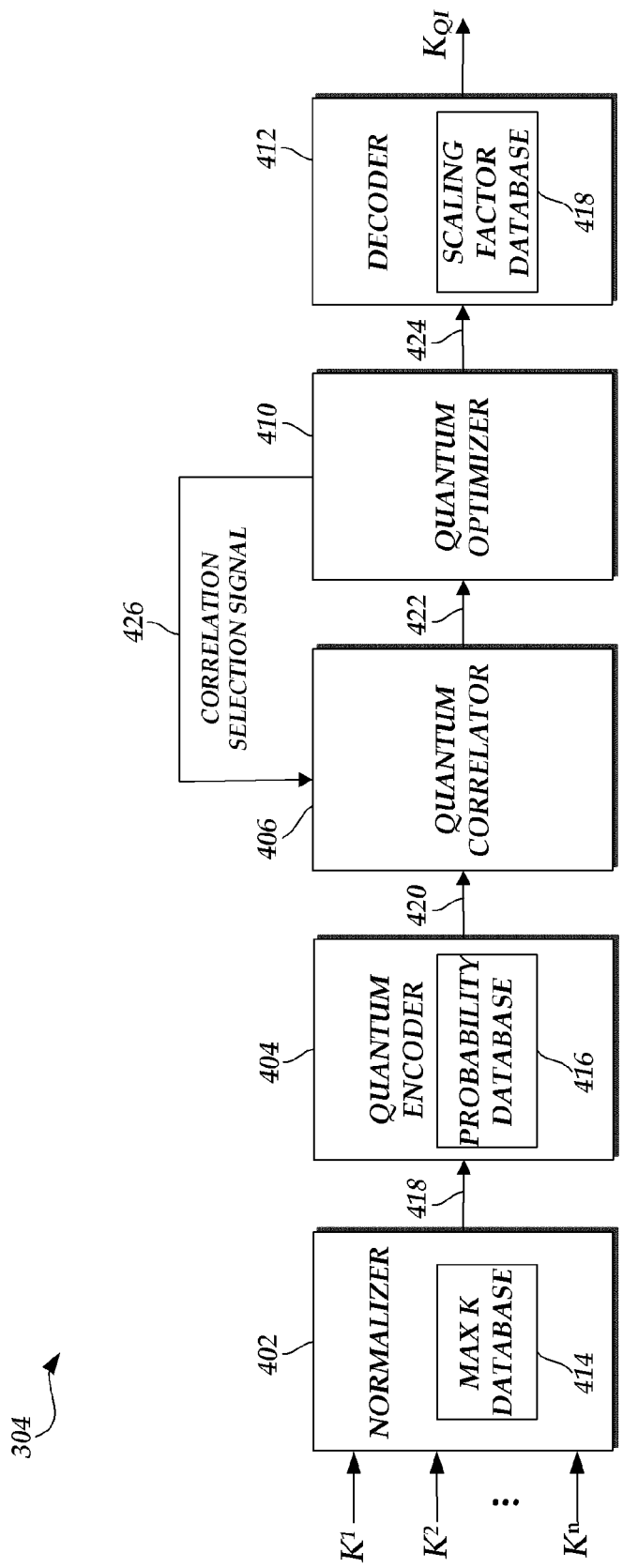
FIG. 4 is an example block diagram of a quantum inference unit according to an embodiment.

FIG. 4 is an example block diagram of the quantum inference unit 304 for processing the n sets of controller gains $K^1$-$K^n$ and generating the robust controller gain $K_{QI}$. The quantum inference unit 304 can include a normalizer 402, a quantum encoder 404, a quantum correlator 406, a quantum optimizer 410 (which can select a correlation type), and a decoder 412, or any combination thereof.

The normalizer 402 can provide the normalized control gains 418 to the quantum encoder 404. The quantum encoder can encode the n sets of controller gains into corresponding quantum states 420. The quantum encoder 404 can include a probability database 416 configured to encode normalized controller gains 418 to quantum states 420. The quantum states 420 can be provided to the quantum correlator 406. The quantum correlator 406 can generate a superposition signal 422 based on correlations of selected states. Correlation and selection can be based on a correlation type signal 426. The superposition signal 422 can be provided to the quantum optimizer 410. The quantum optimizer 410 can be a quantum genetic optimizer that is configured to execute one or more quantum genetic search algorithms. The quantum optimizer 410 can generate one or more robust quantum states 424 that relate to at least one of the combinations in the superposition signal 422. As shown in FIG. 4, the quantum optimizer 410 can also generate the correlation selection signal 426, which can be used by the quantum correlator 406 to select the correlation type. The robust quantum states 424 can be provided to the decoder 412. The decoder 412 can decode the quantum states 424 to generate the robust controller gain $K_Q$ that can be used to tune the controller 106 to control the control object 108.

Figure 5:
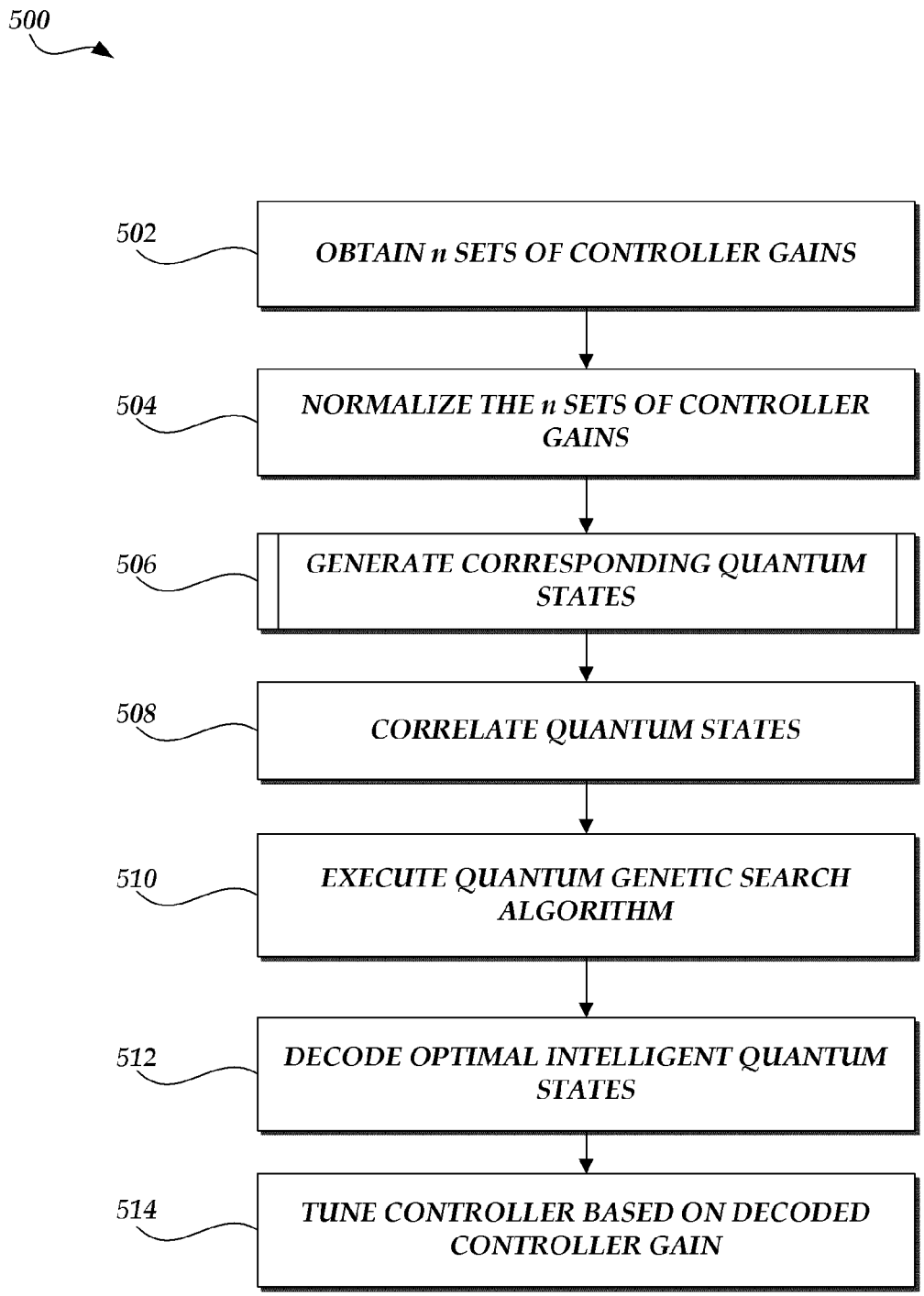
FIG. 5 is an illustrative flow diagram for tuning the parameters of the controller of FIG. 1 according to an embodiment.

FIG. 5 is an illustrative flow diagram of a process 500 for generating the robust controller gains $K_{QI}$. The robust controller gains $K_{QI}$ can be the gains generated by the intelligent quantum tuning unit 104 for tuning the controller 106. At block 502, n sets of controller gains are obtained. Each set of the n controller gains $K^i$ (i=1, . . . , n) can satisfy the control objectives for a range of realizations of the uncertainty. The n sets of controller gains can be obtained, for example, from a robust knowledge base 302, a data store, a separate device, or any combination thereof.

At block 504, the n sets of controller gains can be normalized such that each gain is within a certain bound. For example, the normalizer 402 (FIG. 4) can receive n sets of controller gains $K^1$, $K^2$, . . . , $K^n$ and can output normalized controller gains 418 that are bounded by a specified range. In particular, some embodiments can normalize the n sets of controller gains $K^1$, $K^2$, . . . , $K^n$ such that each controller gain $K_i$ takes on a value on the closed and bounded interval [0, 1]. For instance, the output of the normalizer 410 can be represented by the following equation:

$$\overline{K} = \begin{bmatrix} \overline{K}^1 \\ \overline{K}^2 \\ \vdots \\ \overline{K}^n \end{bmatrix} = \begin{bmatrix} K^1/K_{max}^1 \\ K^2/K_{max}^2 \\ \vdots \\ K^n/K_{max}^n \end{bmatrix}$$ (Equation 9)

In Equation 9, $\overline{K}$ can represent normalized controller gains, $K_{max}^i$ (i=1, . . . , n) can represent a maximum value of the $K^i$. The divisor $K_{max}^i$ can be obtained by simulation results, experimental results, by other prior knowledge such as physical limitations, or any combination thereof. In some embodiments, for example, as shown in FIG. 4, the values for $K_{max}^i$ (i=1, . . . , n) can be stored in a max-K database 414. In some embodiments, the maximum value of $K^i$ can be calculated by querying the robust knowledge base 302 and/or be obtained from another device. Normalization can improve quantum encoding. However, in some embodiments, normalization can be omitted.

At block 506, the normalized gains 418 can be encoded into a set of quantum states, in which each quantum state corresponds to a normalized controller gain. For example, the quantum encoder 404 (FIG. 4) can receive the normalized gains 418 and generate a set of quantum states 420. Encoding conventional controller gains to quantum states can allow for extraction and/or compression of information contained in the aggregate of the n sets of controller gains. One example encoding process 506 will be described in more detail in connection with FIG. 6.

At block 508, a superposition of quantum states can be generated by selectively correlating individual quantum states. For example, the quantum correlator 406 (FIG. 4) can obtain the quantum states 420. The quantum correlator 406 can generate the superposition signal 422, for example, as described in connection with FIG. 6. The superposition signal 422 can be indicative of one or more correlations of selected quantum states. The selected quantum states can be an encoded quantum state corresponding to a controller gain correlated with one or more encoded quantum states corresponding to other related controller gains (for example, a proportional gain can be correlated with encoded quantum states of an integral gain and/or other gains), past/future values of the same controller gains, or any combination thereof. The type of correlation performed on the selected quantum states can be selected offline and/or online.

At block 510, certain quantum states of the superposition signal can be selected to form the robust quantum state based on selection criteria. The robust quantum state can correspond to the quantum state of the robust controller gains $K_{QI}$ used to tune the controller 106. For example, the quantum optimizer 410 (FIG. 4) can be configured to receive the superposition signal 422 and generate the robust quantum states 424. The quantum optimizer 410 can select the robust quantum states by executing quantum algorithms, quantum genetic algorithms, the like, or any combination thereof. The robust quantum states can be optimal quantum states. More detail regarding selecting the robust quantum states and executing these algorithms will be described in connection with FIGS. 8-10.

At block 512, the robust intelligent quantum state is decoded for generating the robust controller gain $K_{QI}$ used in tuning the controller 106. For example, the decoder 412 (FIG. 4) can receive the robust quantum states 424 and generate the robust controller gains $K_{QI}$ by decoding the robust quantum state.

At block 514, a controller can be tuned based on the decoded robust controller gain $K_{QI}$. For example, as illustrated in FIG. 1, the intelligent quantum tuning unit 104 can provide the controller 106 with the robust controller gains $K_{QI}$. FIG. 1 shows that the signal line of $K_{QI}$ "pierces" the block of the controller 106. The piercing signal symbol can represent that the controller 106 is tuned based on the robust controller gains $K_{QI}$. A piercing signal, such as the robust controller gains $K_{QI}$ signal line (FIG. 1), can represent the piercing signal tunes or adjusts certain parameters of the system that it pierces, such as controller 106 (FIG. 1).

Figure 6:
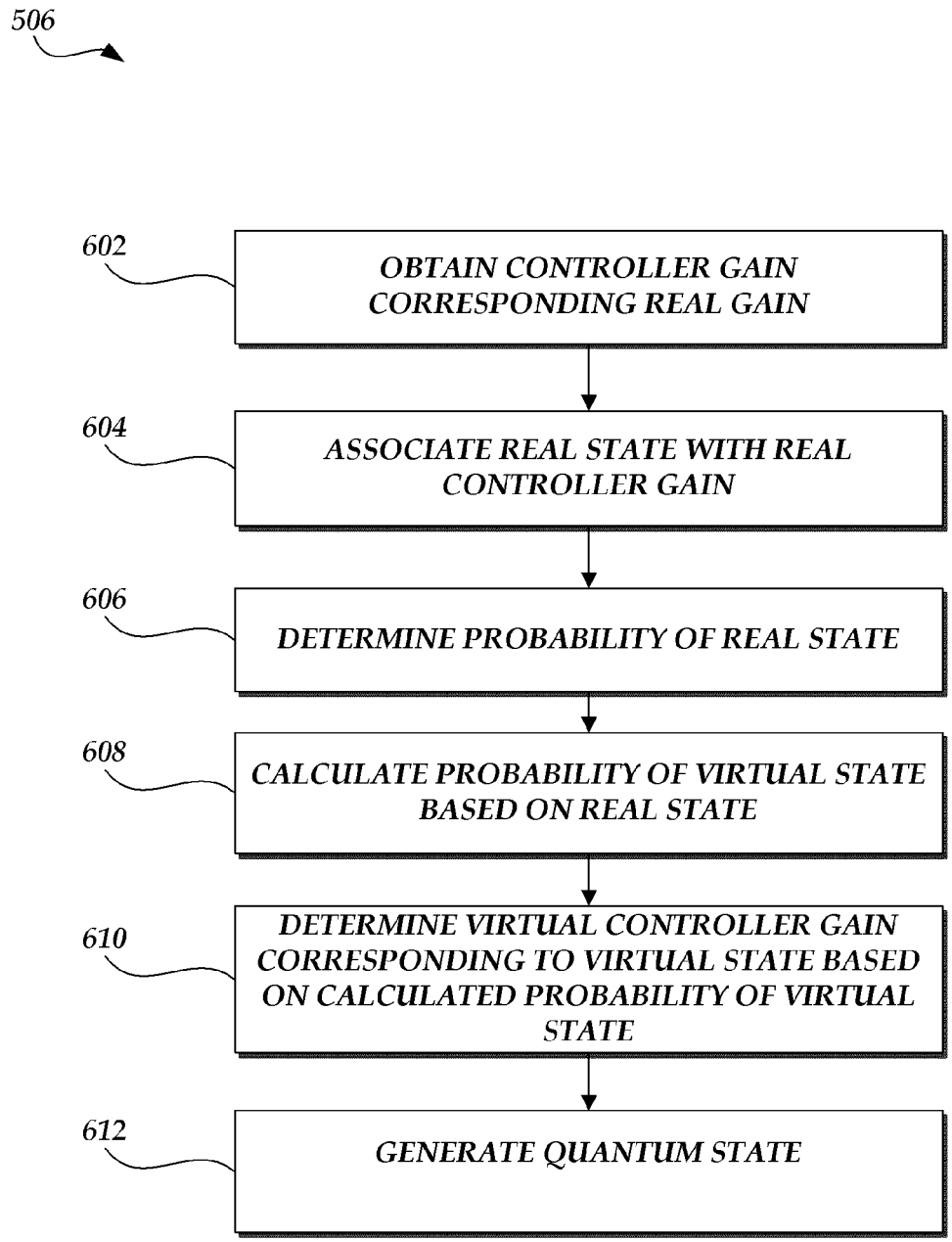
FIG. 6 is an illustrative flow diagram of an example method for encoding controller gains into quantum states that can be implemented as part of the method of FIG. 5 according to an embodiment.

FIG. 6 is an example flow diagram for a process 506 of encoding controller gains into corresponding quantum states. The process 506 can be performed at block 506 of the process 500 in some implementations. The quantum states can include quantum superpositions of real states $|0\rangle$ and virtual states $|1\rangle_{i,j}$, where $i=1, \ldots, n$; $j=1, \ldots, n_c$; and $n_c$ can be the number of controller parameters corresponding to n controller. The generated quantum states can be considered building blocks for a self-assembling algorithm. The real state $|0\rangle$ can correspond to a controller gain generated by a knowledge base, and the virtual state $|1\rangle$ can correspond to a virtual controller gain that can subsequently be determined based on another knowledge base.

At block 602, controller gains corresponding to the real controller gains are obtained. For example, the quantum encoder 404 (FIG. 4) can receive normalized control gains represented by Equation 9, in which $\overline{K}^i = [\overline{k}_{1,j} \ldots \overline{k}_{n_c,j}]^T$ ($i=1, \ldots, n$) can represent a $n_c$-vector; $\overline{k}_{i,j}$ ($j=1, \ldots, n_c$) can represent a scalar representing the jth normalized controller parameter of knowledge base i; and $n_c$ can represent the number of controller parameters. For instance, for the PID controller 106a (FIG. 2A), the normalized controller gains can take on the form $\overline{K}^i = [\overline{k}_{P,i} \overline{k}_{I,i} \overline{k}_{D,i}]^T$ with $n_c=3$.

At block 604, the real controller gains can be associated with their real quantum states $|0\rangle_{i,j}$. For example, the quantum encoder 404 (FIG. 4) can associate a real quantum state $|0\rangle_{i,j}$ with each normalized controller gain $\overline{k}_{i,j}$. At block 606, a probability $p_{i,j}^0$ can be associated with each real state $|0\rangle_{i,j}$ based on the value of the real controller gain. For example, the probability database 416 (FIG. 4) can provide the probability $p_{i,j}^0 = P_{i,j}\{|0\rangle_{i,j}\}$, where $P_{i,j}\{|0\rangle_{i,j}\}$ can represent the probability of real state $|0\rangle_{i,j}$. The probability database 416 can be queried for such probabilities. In some embodiments, the probability database 416 can provide the probability $p_{i,j}^0$ by evaluating a function that approximates the function $P_{i,j}\{|0\rangle_{i,j}\}$. Probability databases can be generated based on offline simulation results. For example, simulations can provide data to generate histograms on the number occurrences of certain values of the controller gains. This data can in turn be used to generate estimates of the probability of certain gain values.

At block 608, the probability $p_{i,j}^1$ of the virtual state $|1\rangle_{i,j}$ can be calculated based on the probability $p_{i,j}^0$ of the real state. The virtual state $|1\rangle_{i,j}$ can be a state corresponding to a virtual gain $\overline{k}_{i,j}^1$ that can subsequently be extracted from the knowledge base. For example, the quantum encoder 404 (FIG. 4) can calculate the probability $p_{i,j}^1$ based on the relationship $p_{i,j}^0 + p_{i,j}^1 = 1$ (for example, by computing $p_{i,j}^1 = 1 - p_{i,j}^0$). At block 610, a virtual controller gain $\overline{k}_{i,j}^1$ corresponding to virtual state $|1\rangle_{i,j}$ can be determined. For example, the quantum encoder 404 can determine the virtual gain $\overline{k}_{i,j}^1$ based on the following equation:

$$\overline{k}_{i,j}^1 = P_{i,j}^{-1}\{p_{i,j}^0\} \quad \text{(Equation 10)}$$

In Equation 10, $P_{i,j}^{-1}$ can represent the inverse map of the probability $P_{i,j}$. In some embodiments, the probability $P_{i,j}$ and/or the inverse map $P_{i,j}^{-1}$ can be calculated offline and stored in the probability database 416 (FIG. 4). In some embodiments, the virtual gains $\overline{k}_{i,j}^1$ can be determined by evaluating a function that approximates the inverse map $P_{i,j}^{-1}$.

At block 612, a quantum state $|k_{i,j}\rangle$ can be generated based the real state $|0\rangle_{i,j}$ and the virtual state $|1\rangle_{i,j}$ and their corresponding probabilities. For example, the quantum encoder 404 (FIG. 4) can generate the quantum state based on the following equation:

$$|k_{i,j}\rangle = a_{i,j}^0 |0\rangle + a_{i,j}^1 |1\rangle \quad \text{(Equation 11)}$$

In Equation 11, $a_{i,j}^0$ can represent the square root of the probability associated with a real state $p_{i,j}^0$ (i.e. $a_{i,j}^0 = \sqrt{p_{i,j}^0}$) and $a_{i,j}^1$ can represent the square root of the probability associated with a virtual state $p_{i,j}^1$ (i.e., $a_{i,j}^1 = \sqrt{p_{i,j}^1}$).

After quantum encoding, the quantum state signal can be processed to generate the superposition signal for extracting knowledge from the dynamic behavior of controller and/or the control object. Applying quantum operations can extract additional quantum information hidden in correlation classical states of control laws. As a result, the n knowledge bases can be unified as a robust knowledge base 302.

Hidden information can be extracted by applying quantum correlations to controller responses. These quantum correlations can also reduce extra information. FIGS. 7A-7D illustrate various ways of performing quantum correlations. The type and form of quantum correlation can coordinate the controller of gains of the n knowledge bases.

FIG. 7A illustrates an example of spatial correlation, in which quantum states of different controller parameters are correlated. FIG. 7A shows that at time $t_i$ quantum states $|k_P\rangle$ and $|k_D\rangle$ can be correlated. The corresponding spatially correlated quantum state can be given by the following equation:

$$|k_P k_D\rangle = |k_P\rangle \otimes |k_D\rangle \quad \text{(Equation 12)}$$

In Equation 12, the $\otimes$ operator can represent the tensor product operator.

In contrast, FIG. 7B illustrates an example of temporal correlation, in which the quantum states of a controller parameter at different points in time are correlated. FIG. 7B illustrates that quantum states of $|k_P\rangle$ can be correlated at different times $t_i$ and $t_j$. For example, the temporal correlation can be represented by the following equation:

$$|k_P(t_i) k_P(t_j)\rangle = |k_P(t_i)\rangle \otimes |k_P(t_j)\rangle \quad \text{(Equation 13)}$$

Correlations can include a combination of the spatial and temporal correlations. For example, FIG. 7C illustrates an example of spatial-temporal correlation. FIG. 7C shows that a quantum state $|k_P\rangle$ at time $t_i$ can be correlated with another quantum state $|k_D\rangle$ at a different time $t_j$. The resulting correlation can be represented by the following equation:

$$|k_P(t_i) k_D(t_j)\rangle = |k_P(t_i)\rangle \otimes |k_D(t_j)\rangle \quad \text{(Equation 14)}$$

Quantum correlations can include internal correlations and/or external correlations. Internal and/or external correlations can be performed in connection with temporal correlations, spatial correlations spatial-temporal correlations, or any combination thereof. FIG. 7D illustrates that quantum correlations can include internal correlation and external correlation. In an internal correlation, quantum states from the same knowledge base can be correlated. In contrast, an external correlation can involve correlating quantum states from different knowledge bases. For example, as shown in FIG. 7D, a correlated quantum state $|k_P\rangle$ can be represented by the following equation:

$$|k_P\rangle = |k_P^1 k_D^1 k_P^2 k_D^2\rangle \quad \text{(Equation 15)}$$

In Equation 15, the internal correlated components of $|k_P\rangle$ are $|k_P{}^1 k_D{}^1\rangle$ and $|k_P{}^2 k_D{}^2\rangle$, and the external correlated components of $|k_P\rangle$ are $|k_P{}^1 k_D{}^1\rangle$ and $|k_P{}^2 k_D{}^2\rangle$. FIG. 7D also shows an example internal and external correlation for correlated quantum states $|k_D\rangle$ and $k_1\rangle$. In general, each robust controller gain $k_{QI,i}$ of the robust controller gains $K_{QI}$ can have an associated correlated quantum state $|a_{i,1} \ldots a_{i,n_s}\rangle$, where each associated quantum state $|a_{i,j}\rangle$ can correspond to a quantum state generated by the quantum encoder 404 (for example, via the process 506 of FIG. 6) and $n_S$ is the number of selected quantum states for quantum correlation.

The information obtained by measurements y (FIG. 1) can be a one-sided information exchange. In particular, the amount of available extracted information can increase. In this case, states with such a property are not necessarily entangled, and the corresponding channel of information transmission can be realized using a Hadamard transform. Therefore, by using a Hadamard transform (and quantum correlation as a physical carrier of message transmission between a finite number of designed knowledge bases), it is possible to include larger amount of information in an initial quantum state by accounting for existing hidden states in a classical correlation. These effects can be taken into account, for example, during quantum correlation of control gains.

This approach makes it possible to understand more completely the solution to the problem of determining the role and influence of quantum effects on increasing the robustness level of the designed control systems. The design of knowledge base quantum self organization can be performed in two parts using a soft computing optimizer and a quantum computing optimizer. In the first part, a finite set of knowledge bases for given control situations can be developed offline based on optimizing knowledge bases with soft computing. In the second part, a quantum inference model can be applied online to realize self-organization of the responses of the n knowledge bases, which can result in a robust knowledge base 302. In design using the quantum inference unit 304, it may not be necessary to form new production rules to handle new types of uncertainties. For instance, it can be sufficient to obtain real-time reactions of production rules of the n knowledge bases. Advantageously, the quantum inference unit 304 may not require knowledge of which particular production rules are activated.

The choice of the correlation type and its corresponding form can affect the performance of the self-organizing controller. The selection of the correlation type and form is discussed below in connection with the quantum optimizer 410.

Figure 8:
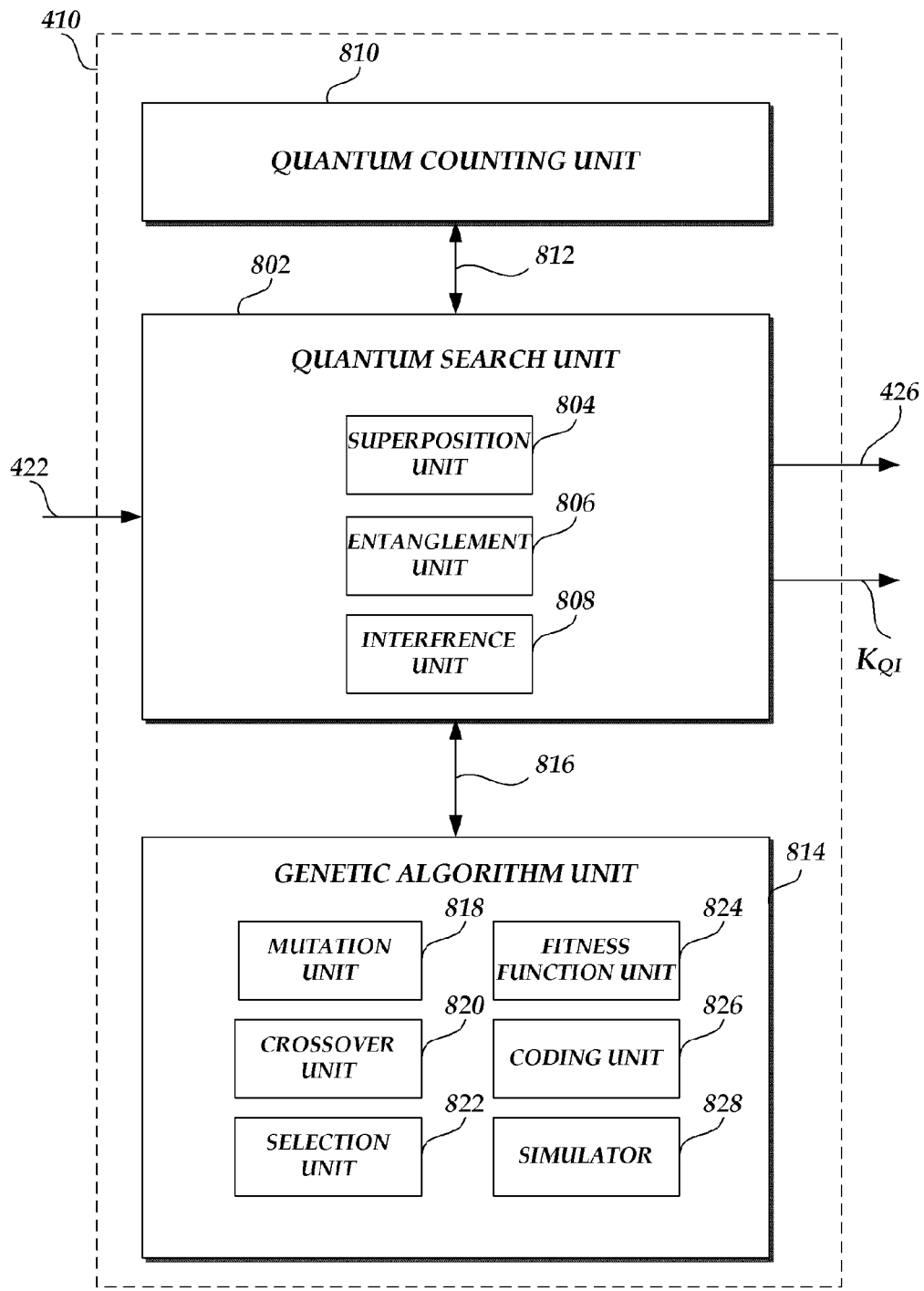
FIG. 8 is a block diagram of an illustrative quantum genetic optimizer according to an embodiment.

FIG. 8 is a block diagram of an example quantum optimizer 410 configured to select the quantum correlation type and select the robust controller gain $K_{QI}$. The quantum optimizer 410 can include a quantum search unit 802 that is in communication with a quantum counting unit 810 and a genetic algorithm unit 814. The quantum search unit 802 can receive the superposition signal 422 and select the robust quantum states 424 associated with the robust controller gains $K_{QI}$. In some embodiments, the quantum search unit 802 can generate the correlation selection signal 426 for choosing the correlation type of the correlation performed by the quantum correlator 406. In some embodiments, quantum optimizer 410 can perform any combination of the operations described herein in connection with the optimizer 310.

One example of how the robust quantum states 424 are selected from the superposition signal will be described for illustrative purposes. Two knowledge bases can generate the controller gains $K^1=[k_{1,P}, k_{1,I}, k_{1,D}]^T$ and $K^2=[k_{2,P} k_{2,I} k_{2,D}]^T$. The correlated quantum state $|k_P\rangle$ of the superposition signal can correspond to the robust controller gains $k_{QI,P}$ as represented by the following equation:

$$|k_P\rangle = |k_{1,P}^0 k_{2,P}^0\rangle + |k_{1,P}^0 k_{2,P}^1\rangle + |k_{1,P}^1 k_{2,P}^0\rangle + |k_{1,P}^1 k_{2,P}^1\rangle = \quad \text{(Equation 16)}$$
$$\frac{1}{2}(\alpha_1 |00\rangle + \alpha_2 |01\rangle + \alpha_3 |10\rangle + \alpha_4 |11\rangle)$$

In Equation 16, the following relationships can hold: $\alpha_1 = a_{1,P}^0 a_{2,P}^0$, $\alpha_1 = a_{1,P}^0 a_{2,P}^1$, $\alpha_1 = a_{1,P}^0 a_{2,P}^0$, and $\alpha_1 = a_{1,P}^1 a_{2,P}^0$. As described earlier, $a_{i,P}^0 = \sqrt{p_{i,P}^0}$ and can represent the corresponding square roots of the probabilities of the real controller state $|0\rangle_{i,P}$ and the virtual controller state $|0\rangle_{i,P}$. The quantum optimizer 410 can select the correlated state with the maximum probability amplitude $\alpha_i^*$. Then the robust quantum states can have the form $\alpha_i^* |b_1 b_2\rangle$. The selection can be made using quantum optimizing and/or quantum search algorithms, such as quantum genetic optimization and/or quantum genetic search algorithms. The correlated state with the maximum probability amplitude $\alpha_i^*$ can be referred to as the intelligent state.

The mathematical structure of the quantum optimizer 410 can be described as a set of genetic and quantum operations:

$$QGO = \{C, Ev, P^0, L, \Omega, \chi, \mu, Sup, Ent, Int, \Lambda\} \quad \text{(Equation 17)}$$

In Equation 17, QGO can represent a quantum genetic optimizer; C can represent a genetic coding scheme of individuals for a given problem; Ev can represent a genetic evaluation function to compute the fitness values of the individuals; $P^0$ can represent an initial population; L can represent a size of the population; $\Omega$ can represent a genetic selection operator; $\chi$ can represent a genetic crossover operator; $\mu$ can represent a genetic mutation operator; Sup can represent a quantum linear superposition operator; Ent can represent a quantum entanglement operator (for example, quantum super-correlation); Int can represent a quantum interference operator. The operator $\Lambda$ can represents termination conditions, which can include the stopping criteria as a minimum of Shannon/von Neumann entropy, the optimum of the fitness functions, the minimum risk, or any combination thereof. Accordingly, a quantum genetic optimizer can be configured to execute the three genetic algorithm operations of selection-reproduction, crossover, and mutation, and the three quantum search algorithm operations of superposition, entanglement and interference. In some implementations, a quantum genetic optimizer can include any subset of a set that includes the three genetic algorithm operations and the three quantum search algorithm operations.

The quantum search unit 802 can determine the intelligent quantum states from which the robust controller gain $K_{QI}$ can be decoded. The design process of quantum search unit 802 can include designing a matrix of the three quantum operators: superposition (Sup), entanglement (Ent) and interference (Int). To facilitate the performance of these quantum operators, the quantum search unit 802 can include a superposition unit 804, an entanglement unit 806, and an interference unit 808. Based on these operations, the structure of a quantum search unit 802 can implement operations execute the following equation:

$$|\psi_{fin}\rangle = \{[(D_n \otimes I) \cdot U_f]^{h \cdot (n+1)H)}\} \cdot \{(U_f \cdot P \cdot U_f) \cdot Pr \cdot (U_f \cdot P \cdot U_f)\} H |\psi_0\rangle \quad \text{(Equation 18)}$$

In Equation 18, $|\psi_0\rangle$ can represent an initial quantum state; $|\psi_{fin}\rangle$ can represent a final quantum state; H can represent a Hadamard transform; I can represent an identity operator; $U_f$ can represent an entanglement (quantum correlation) matrix; P can represent a permutation operator; Pr can represent a projection operator; and $D_n$ can represent a diffusion operator. Although, a quantum search unit 802 that is configured to implement the operations of Equation 18 can be based on the Grover quantum search algorithm, the quantum search unit 802 can be implemented using various other quantum algorithms (QA), such as the Deutsch QA, the Deutsch-Jozsa QA, the Simon QA, the Shoes QA, or any suitable control quantum search algorithm. As discussed above, one portion of the design process is the choice of the entanglement (quantum correlation) operator $U_f$.

Some of the operations performed by the quantum search unit 802 can alternatively or additionally be performed by other components of the quantum inference unit 304. For example, the quantum correlator 406 can generate a superposition and correlation (i.e., entanglement) of selected quantum states. Accordingly, in some embodiments, at least a portion of some of the quantum operation units 804-808 can be distributed, shared, or duplicated across components of the intelligent quantum tuning unit 104, including the optimizer unit 312 in FIG. 3B.

In some embodiments, a number of marked solutions is unknown. In this case, the quantum optimizer 410 can use a quantum counting unit 810 to determine the number of marked solutions in order to determine the robust controller gains $K_{Qf}$. The quantum counting unit 810 can be coupled with the quantum search unit 802 by line 812. One surprising result of quantum mechanics is that we can find what we do not know. For example, Grover's algorithm can be used to search a phone book with N entries to find the name corresponding to a given phone number in $O(\sqrt{N})$ operations, in contrast to the best known classical algorithms that require $O(N)$ operations. A classical search algorithm would need $N/2$ database queries on average and in the worst case it would need $N-1$ queries, which are both more than Grover's algorithm.

In the case of a number of marked elements M in an unsorted database of size N, the number of operations of a quantum search process increase as $O(\sqrt{N/M})$. For instance, Boyer et al. have extended Grover's quantum search algorithm to the case when M>1. M. Boyer, G. Brassard, P. Hoyer, and A. Tapp, Tight bounds on quantum searching, Fortsch. Phys. Vol. 46, 1998, pp. 493-506. The simplest case is if M is known. We can run the algorithm with $\lceil \pi/4\sqrt{N/M} \rceil$ iterations instead of $\lceil \pi/4\sqrt{N} \rceil$.

One item in search space can be considered marked if there is a corresponding oracle which has the ability to identify a solution to the search problem when the oracle sees a solution. Generally, there can be two registers. The first register can store an index x to an element in a search space, and the second register can represent a single state z. With s representing the marked item, then the oracle can have the mapping $|x\rangle |z\rangle |x\rangle \mapsto |z \oplus \delta_{sx}\rangle$. Thus, the oracle can recognize solutions to the search problem, in the sense that it can flip the second register when the oracle finds the solution to the problem in the first register. Accordingly, the oracle can recognize the solution when the oracle processes the solution.

When the first register is prepared in the state $|x\rangle$ and the second register in the superposition $|0\rangle - |1\rangle$, then the effect of the oracle can be represented by the following equation:

$$|x\rangle (|0\rangle - |1\rangle) \mapsto (-1)^{\delta_{sx}} |x\rangle (|0\rangle - |1\rangle)$$ (Equation 19)

The state of the second register is not changed by the operation of Equation 19. Accordingly, the state of the second register can be ignored, and the action of the oracle can be simplified to $|x\rangle \mapsto (-1)^{\delta_{sx}} |x\rangle$.

A more difficult case is when a number of marked elements M is not known in advance. One problem is that if too many iterations of the quantum search algorithm are executed, then an erroneous answer may result. This problem can be handled by two different approaches. The first approach runs the quantum search unit 802 several times with different numbers of steps. The second approach executes the quantum counting algorithm on the quantum counting unit 810 to estimate the number of marked elements M, and then chooses the number of operations for the search algorithm on the quantum search unit based on the estimated number of marked elements M.

The genetic algorithm unit 814 can be in communication with the quantum search unit 802 via line 816. The genetic algorithm unit 814 can determine parameters of quantum search unit 802 (for example, the correlation type of the entanglement unit 808), in order to determine selected (for example, optimal) robust controller gains $K_{Qf}$. The genetic algorithm unit 814 can include a mutation unit 818, a crossover unit 820, a selection unit 822, or any combination thereof to support the genetic operations of a genetic algorithm. The genetic algorithm unit 814 can also include a fitness function unit 824 to evaluate the fitness of the resulting populations (solutions). Example fitness functions can include criteria of control quality from Table 1. The genetic algorithm unit 814 can include a coding unit 826 for encoding/decoding tunable parameter, for example, the correlation types, superposition, and interference operators and other parameters the quantum search unit 802; parameters and gains of the controller 106; parameter and gains of the robust knowledge base 302, the like, or any combination thereof. The coding unit 826 can encode tunable parameters from a binary representation to a quantum representation. Alternatively or additionally, the coding unit 826 can decode tunable parameters from a quantum representation to a binary representation. The genetic algorithm unit 814 can also include a simulator 828 configured to estimate the fitness of certain solutions without probing the actual control object 108.

Figure 9:
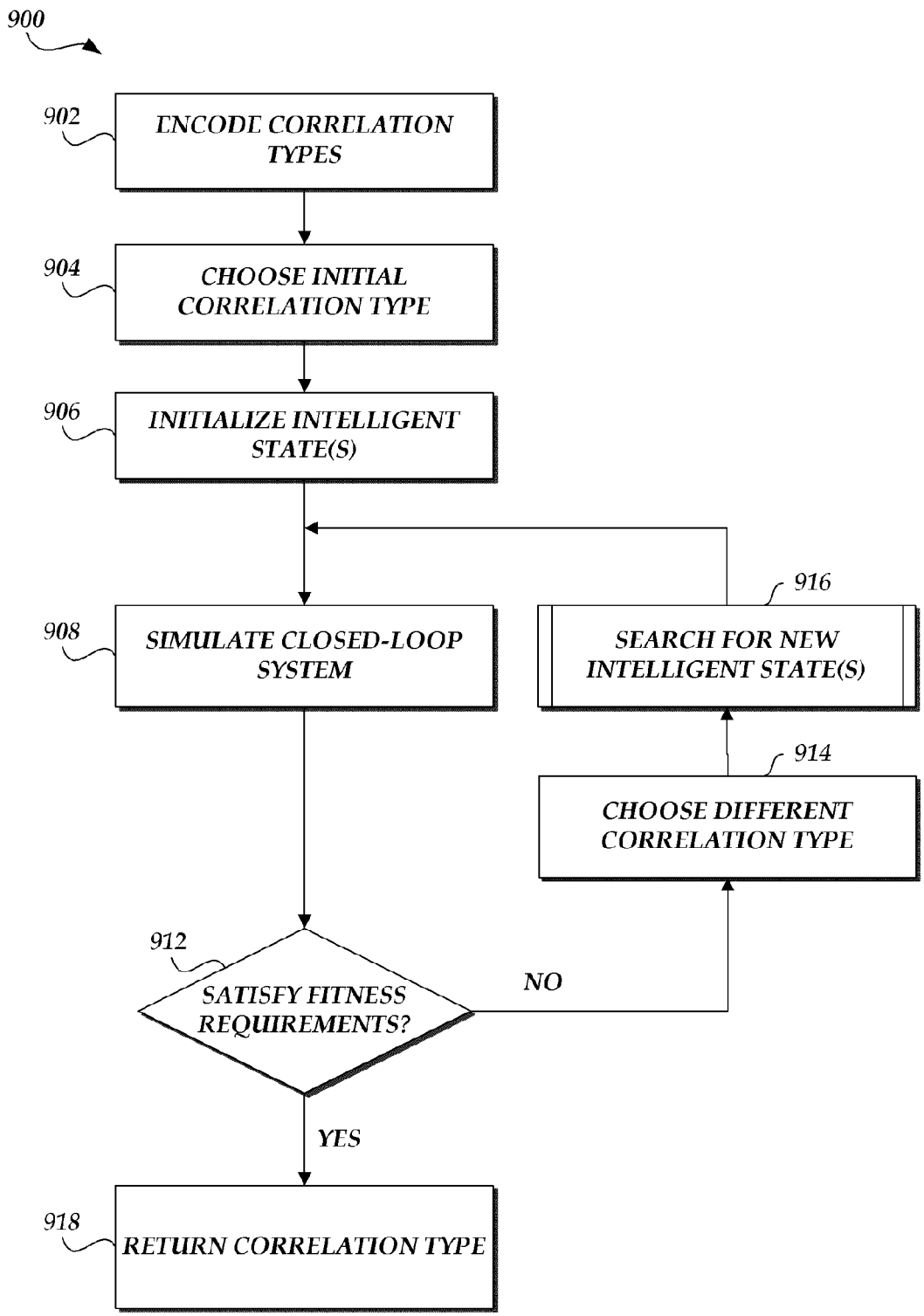
FIG. 9 is an illustrative flow diagram for selecting a correlation type of the quantum correlator according to an embodiment.

FIG. 9 is an illustrative flow diagram of a process 900 for selecting the correlation type of the quantum correlator. At block 902, the correlation types can be encoded. The genetic algorithm unit 814 can, for example, access the coding unit 826 to acquire a set of candidate correlation types and their corresponding codes. An initial correlation type and code can be chosen from the set of candidate correlation types and their corresponding codes, at block 904.

At blocks 906 and 908, the intelligent states of a closed-loop simulation can be initialized and the closed-loop system can be simulated. The intelligent states can include the robust control gains $K_{Qf}$ for a simulation model of the closed-loop system 100. Simulations, rather than real experiments, can be convenient for running a large number of experiments. The simulator 828 of the genetic algorithm unit 814 can perform a simulation. The genetic algorithm unit 814 can utilize measurements y from the control object 108 (for example, real-time experiments and/or closed-loop system identification) as an alternative or in addition to simulation.

At block 912, the results of the simulation can be evaluated to determine whether the fitness requirement is satisfied. In some embodiments, the genetic algorithm unit 814 can provide the fitness function unit 824 the results from closed loop simulation generated at block 908 to evaluate the correlation-type selection. The fitness requirements of an algorithm executed by the genetic algorithm unit 814 (for example, evaluated on the fitness function unit 824) can be described by the following equation:

$$\min_{\substack{control\ force,\\ generalized\ entropy}} |\vec{X}| \leq \vec{X}_0 \quad \text{(Equation 20)}$$

In Equation 20, $\vec{X}$ can represent a vector of control object output parameters, and $X_0$ can represent restrictions on control object output parameters such that a control force and generalized entropy are minimum. As illustrative examples, Table 1 provides performance measures that can be used as part of the fitness requirements.

At block 912, when the fitness requirements are satisfied, the correlation type corresponding to the closed loop simulation executed at block 908 can be selected as the selected correlation type. Otherwise, a different correlation type can be chosen at block 914. Different intelligent states can then be searched for corresponding to the different correlation type at block 916. The genetic algorithm unit 814 can choose a new correlation type based on the genetic operators implemented by the mutation unit 818, the crossover unit 820, the selection unit 822, or any combination thereof. The different intelligent states can be searched for, for example, based on the quantum operators implemented by the quantum search unit 802, for example, superposition, entanglement, interference, or any combination thereof. The process 900 can iterate through blocks 908-916 until the fitness requirements are satisfied at block 912. When the fitness requirements are satisfied, the selected correlation type can be returned at block 918.

Figure 10:
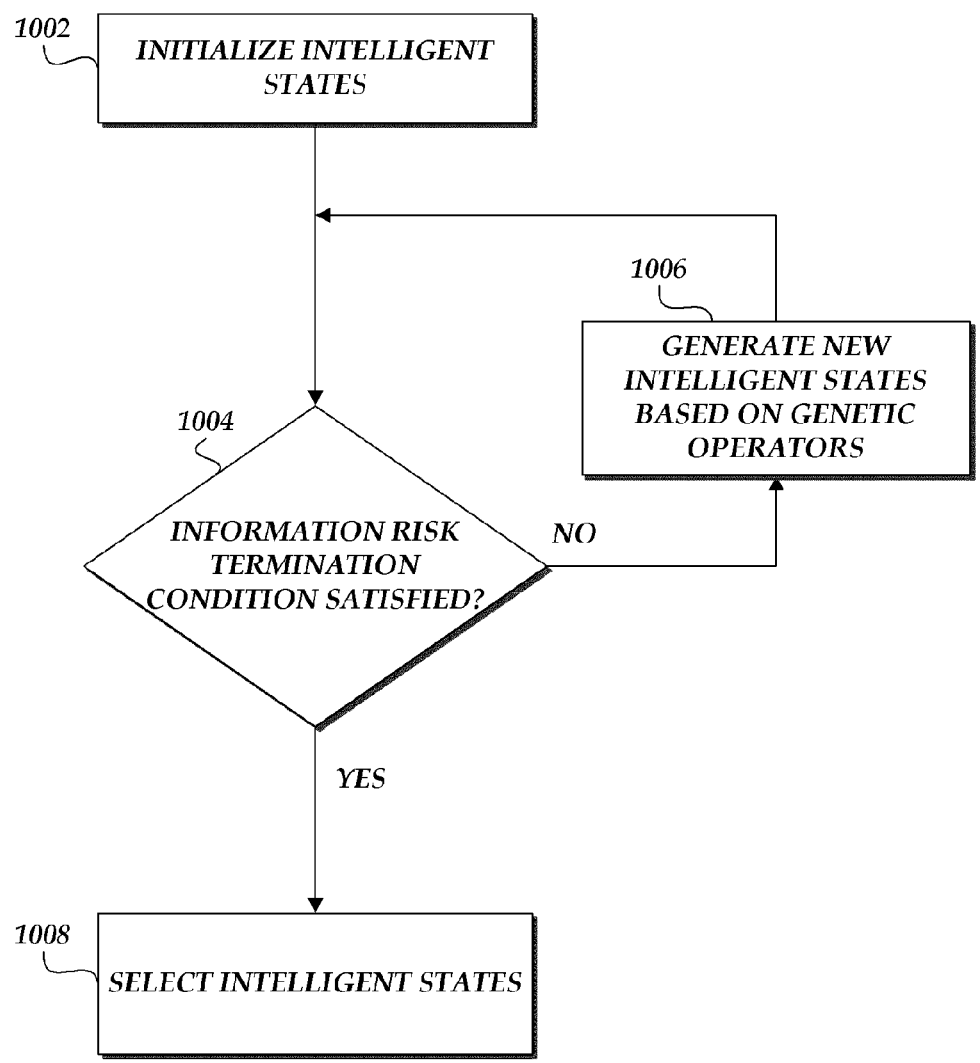
FIG. 10 is an illustrative flow diagram of a quantum genetic search algorithm including information risk termination conditions according to an embodiment.

FIG. 10 is an illustrative flow diagram of a process 916 corresponding to a quantum search algorithm that can be used to search for intelligent state at block 916 of the process 900. The process 916 can include information risk termination conditions. The process 916 can include initializing intelligent states at block 1002. In some implementations, the initial intelligent states can be provided externally. An intelligent quantum state $|x\rangle$ is one possible approach for selecting a quantum state based on optimal criteria from superposition of possible coding states for controller coefficient gains. In this context, an "intelligent quantum state" can represent the quantum state with minimal uncertainty, for example, the minimum uncertainty in a Heisenberg inequality. The intelligent quantum state can be correlated with solutions of quantum wave equations (for example, Schrödinger-like equations) when a wave function of a quantum system corresponds to a coherent state and the uncertainty has a global minimum. The intelligent quantum state can be generated, for example, based on the difference between von Neumann entropy and Shannon information entropy in this quantum state. Accordingly, an intelligent quantum state can be the minimum of the difference between Shannon information entropy and physical entropy von Neumann on this quantum state:

$$I(|\text{Quantum state}\rangle) = \min(H^{Sh} - S^{vN}) \quad \text{(Equation 21)}$$

In Equation 21, $H^{Sh}$ can represent Shannon entropy and $S^{vN}$ can represent von Neumann entropy. Thus the intelligent quantum state described in Equation 21 corresponds to a minimum of Shannon information entropy of quantum state. This minimum can correspond to a maximum probability state (according to definition of Shannon information $$\text{entropy } H^{Sh} = -\sum_i p_i \ln p_i,$$

global minimum observed for maximum probability $p_i$). The maximum amplitude of probability corresponding to a correlated state can be used to select the intelligent correlated (coherent) quantum state in the superposition of possible candidate quantum states. For instance, the maximum probability amplitude can correspond to the absolute value of the probability to the second power ($p = |\psi|^2$).

Therefore, a quantum oracle model can be realized by calculating amplitude probabilities corresponding to a superposition state with mixed types of quantum correlations and a selection state with maximum amplitude probability. Accordingly, the quantum oracle can have necessary information to identify a solution. For example, in Equation 16 the intelligent state between the classical states ($|00\rangle, |01\rangle, |10\rangle, |11\rangle$) can correspond to maximal probability amplitude $\alpha_i$, $i=1, 2, 3, 4$ from the probability amplitude set ($\alpha_1, \alpha_2, \alpha_3, \alpha_4$).

Otherwise, the intelligent states $|x\rangle$ can be initialized according to the following equation:

$$|x\rangle = \sum_{i=1}^{t} c_i |x_i\rangle \quad \text{(Equation 22)}$$

In Equation 22, each $x_i$ can represent a randomly (or pseudo randomly) generated real number; each $c_i$ can represent a randomly (or pseudo randomly) generated complex number, such that $$\sum_{i=1}^{t} \|c_i\|^2 = 1;$$

and $\text{Int}^1$ can represent a randomly (or pseudo randomly) generated unitary operator of order t.

At block 1004, whether the information risk termination condition is satisfied can be determined. For example, the quantum search unit 802 can generate a matrix described by the following equation:

$$A = \begin{pmatrix} \sum_{i=1}^{t} c_i |x_i + \varepsilon_{i,1}\rangle \\ \sum_{i=1}^{t} c_i |x_i + \varepsilon_{i,2}\rangle \\ \vdots \\ \sum_{i=1}^{t} c_i |x_i + \varepsilon_{i,k}\rangle \end{pmatrix} \quad \text{(Equation 23)}$$

In Equation 23, each $|\varepsilon_{i,j}| \leq \varepsilon$ can be randomly (or pseudo randomly) generated such that $x_{i,j} + \varepsilon_{i,j} \neq x_{k,j} + \varepsilon_{k,j}$ if $i_1 \neq i_1$. Further, the quantum search unit 802 can generate a matrix described by the following equation:

$$\overline{B} = \begin{pmatrix} Int^1 \sum_{i=1}^{t} c_i |x_i + \varepsilon_{i,1}\rangle \\ Int^2 \sum_{i=1}^{t} c_i |x_i + \varepsilon_{i,2}\rangle \\ \vdots \\ Int^k \sum_{i=1}^{t} c_i |x_i + \varepsilon_{i,k}\rangle \end{pmatrix} = \begin{pmatrix} \sum_{i=1}^{t} c'_{i,1} |x_i + \varepsilon_{i,1}\rangle \\ \sum_{i=1}^{t} c'_{i,2} |x_i + \varepsilon_{i,2}\rangle \\ \vdots \\ \sum_{i=1}^{t} c'_{i,k} |x_i + \varepsilon_{i,k}\rangle \end{pmatrix} \quad \text{(Equation 24)}$$

In Equation 24, each $Int^j$ can represent a unitary squared matrix of order t. The interference operator $Int^1$ can be chosen as a random unitary squared matrix of order t, whereas the interference operators for the other paths can be generated from $Int^1$. Non-limiting examples of such matrices include the Hadamard transformation matrix $H_t$ and the diffusion matrix $D_t$, described above. It will be understood that many other suitable matrices can be generated. The application of entanglement and interference operators as in Equation 18 can produce a new superposition of maximal length t. According to this sequence of operations, k different superpositions can be generated from the initial superposition using different entanglement and interference operators. Each time the average entropy value can be evaluated. Selection can include holding only the superposition with a minimum average entropy value. When the superposition corresponding to the minimum average entropy is obtained, this superposition can become the new input superposition and the process can start again. The interference operator that has generated the minimum entropy superposition can be hold and $Int^1$ can be set to this operator for the new operation. The computation can stop when the minimum average entropy value falls under a predetermined threshold and/or a critical limit. At this point measurement can be simulated, from which a basis value can be extracted from the final superposition according to a square modulus of its probability amplitude. In turn, from the matrix $\overline{B}$ the quantum search unit can generate the information risk termination conditions based on the following equation:

$$|output^*\rangle = \sum_{i=1}^{t} c'_{i,j^*} |x_i + \varepsilon_{i,k}\rangle \quad \text{(Equation 25)}$$

$$j^* = \arg\min_{j} \sum_{i=1}^{t} \|c'_{i,j}\|^2 |x_i + \varepsilon_{i,j}\rangle$$

$$\overline{E}^* = \sum_{i=1}^{t} \|c'_{i,j^*}\|^2 |x_i + \varepsilon_{i,j^*}\rangle$$

The information risk increment $\Delta \rho$ can be calculated, for example, as described above. When the termination condition is satisfied, intelligent states can be selected at block 1008. For example, if $\overline{E}^* < E^1$ and the information risk increment $\Delta \rho < \overline{\rho}$ intelligent states can be selected, for example, by extracting $x_i^* + \epsilon_{i,j}^*$ from $\{x_i^* + \epsilon_{i,j}^*, \|c'_{i,j}\|^2\}$. When the termination condition is not satisfied, new intelligent states can be generated based on quantum and/or genetic algorithms at block 1006. Then the process 916 can return to block 1004.

The quantum search unit 802 can, for example, set $|x\rangle$ and $Int^1$ based on a Grover quantum search algorithm (which can be executed at block 1004 to search for $j^*$) and/or based on any suitable genetic algorithm. For example, the quantum search unit 802 can set the intelligent state as $|x\rangle = |output^*\rangle$, $Int^1 = Int^{j*}$.

Returning to FIG. 4, the decoder 412 can obtain the robust quantum states 424 and determine the robust controller gains $K_{QI}$ by decoding the robust quantum states 424. The $i^{th}$ robust quantum state can have the form $\alpha_i^* |b_{i,1} \ldots b_{i,n_S}\rangle$ in which $n_S$ can represent the number of selected states for correlation. The $i^{th}$ robust quantum state can have the maximum probability of the quantum states. The $i^{th}$ robust controller gain $k_{QI,i}$ of $K_{QI}$ can be decoded according to the following equation:

$$k_{QI,i} = C_P \frac{1}{\sqrt{2^{n_S}}} \sum_{j=1}^{n_S} b_{i,j}^2 \quad \text{(Equation 26)}$$

In Equation 26, $C_P$ can represent a scaling factor that can be used to denormalize and/or optimally scale the controller gains. The optimal scaling can be determined using soft computing design techniques (for example, genetic algorithms). The scaling factor $C_P$ can be stored and retrieved from the scaling factor database 418. In some embodiments, the scaling factor $C_P$ can be the inverse of normalizing denominator in Equation 9. In some embodiments, the robust controller gains $K_{QI}$ are not based on the scaling factor $C_P$.

Quantum-PID Controller

An example Quantum PID controller design based on quantum inference with two sets of classical PID gains $K^1$ and $K^2$, with the classical PID gains being constant, will be described. The general structure of the example Quantum PID controller can be implemented with and/or include any combination of features described with reference to the systems, apparatus and/or methods described herein, for example, the systems, apparatus and/or methods of FIGS. 1, 2A, 3A, 4-10.

For two teaching conditions, the two gains $K_1 = [k_P^1 \ k_D^1 \ k_I^1]^T$ and $K_2 = [k_P^2 \ k_D^2 \ k_I^2]^T$ can be designed by using a PID tuning method based on a genetic algorithm. By using an artificial stochastic noise disturbance, the gains can be obtained according to the following equation:

$$K_{1,2}(t) = \begin{bmatrix} k_P + G_P \cdot \xi(t) \\ k_D + G_D \cdot \xi(t) \\ k_I + G_I \cdot \xi(t) \end{bmatrix}, \quad \text{(Equation 27)}$$

where $\xi(t)$ – stochastic noise with amplitude 1

In Equation 27, $G_P$, $G_D$, $G_I$ can represent increasing and/or decreasing coefficients that can be chosen manually. The stochastic noise can aid in generating the simulation data to generate the probability database 416 used to determine the quantum states $|0\rangle$ and $|1\rangle$ by the quantum decoder 404. The quantum inference unit 304 can perform one or more of the following operations.

Operation 1: Coding.

The normalizer 402 and/or the quantum encoder 403 can prepare normalized states $|0\rangle$ and $|1\rangle$ for current values of disturbed control signals $K_1$ and $K_2$ including (a) calculation of probability amplitudes $\alpha_0$, $\alpha_1$ of states $|0\rangle$ and $|1\rangle$ from histograms, and (b) using the $\alpha_1$ calculation of normalized value of state $|1\rangle$.

Operation 2: Choosing Quantum Correlation Type for Preparation of an Entangled State.

The quantum correlator 406 can perform any of the correlations described herein. For example, the quantum correlator 406 can perform a spatial correlation according to the following equations:

$$e_1 e_2 k_P^{1,2} k_D^{1,2} \to k_P^{new} \cdot gain_P;$$

$$\dot{e}_1 \dot{e}_2 k_D^{1,2} k_I^{1,2} \to k_D^{new} \cdot gain_D;$$

$$Ie_1 Ie_2 k_I^{1,2} k_P^{1,2} \to k_I^{new} \cdot gain_I \quad \text{(Equation 28)}$$

In Equation 28, e, ė, Ie can represent control error, derivative and integral of control error and $gain_{P(D,I)}$ can represent scaling factors that can be obtained by a genetic algorithm. A quantum state $|a_1 a_2 a_3 a_4 a_5 a_6\rangle = |e_1 e_2 k_P^1(t) k_D^1(t) k_P^2(t) k_D^2(t)\rangle$ can be considered as an entangled state.

Operation 3: Superposition and Entanglement.

According to the selected correlation type, the quantum optimizer 410 can construct superposition of entangled states.

Operation 4: Interference and Measurement:

The quantum optimizer 410 can select a quantum state $a_1 a_2 a_3 a_4 a_5 a_6\rangle = |e_1(t) e_1(t) k_P^1(t) k_D^1(t) k_P^2(t) k_D^2(t)\rangle$ with maximum amplitude of probability $A = \sqrt{P_{e_1}} \sqrt{P_{e_2}} \sqrt{P_{k_P^1}} \sqrt{P_{k_D^1}} \sqrt{P_{k_P^2}} \sqrt{P_{k_D^2}}$. A subvector $|k_P^1(t) k_D^1(t) k_P^2(t) k_D^2(t)\rangle$ can also be selected.

Operation 5: Decoding.

The decoder 412 can decode the selected quantum state. The decoder 412 can also calculate a normalized output as a norm of the subvector of the chosen quantum state according to the following equation:

$$k_P^{new}(t) = \frac{1}{\sqrt{2^{n-2}}} \sqrt{\langle a_3 \ldots a_n | a_3 \ldots a_n \rangle} = \frac{1}{\sqrt{2^{n-2}}} \sqrt{\sum_{i=3}^{n} (a_i)^2} \quad \text{(Equation 29)}$$

Operation 6: Denormalization.

The decoder 412 can calculate a final (denormalized) output according to the following equation:

$$k_P^{output} = k_P^{new}(t) \cdot gain_P, k_D^{output} = k_D^{new}(t) \cdot gain_D,$$
$$k_I^{output} = k_I^{new}(t) \cdot gain_I. \quad \text{(Equation 30)}$$

In Equation 30, scaling gains $\{gain_P, gain_I, gain_D\}$ can be identified by executing genetic algorithm. The final output can be provided to the controller.

Figure 11:
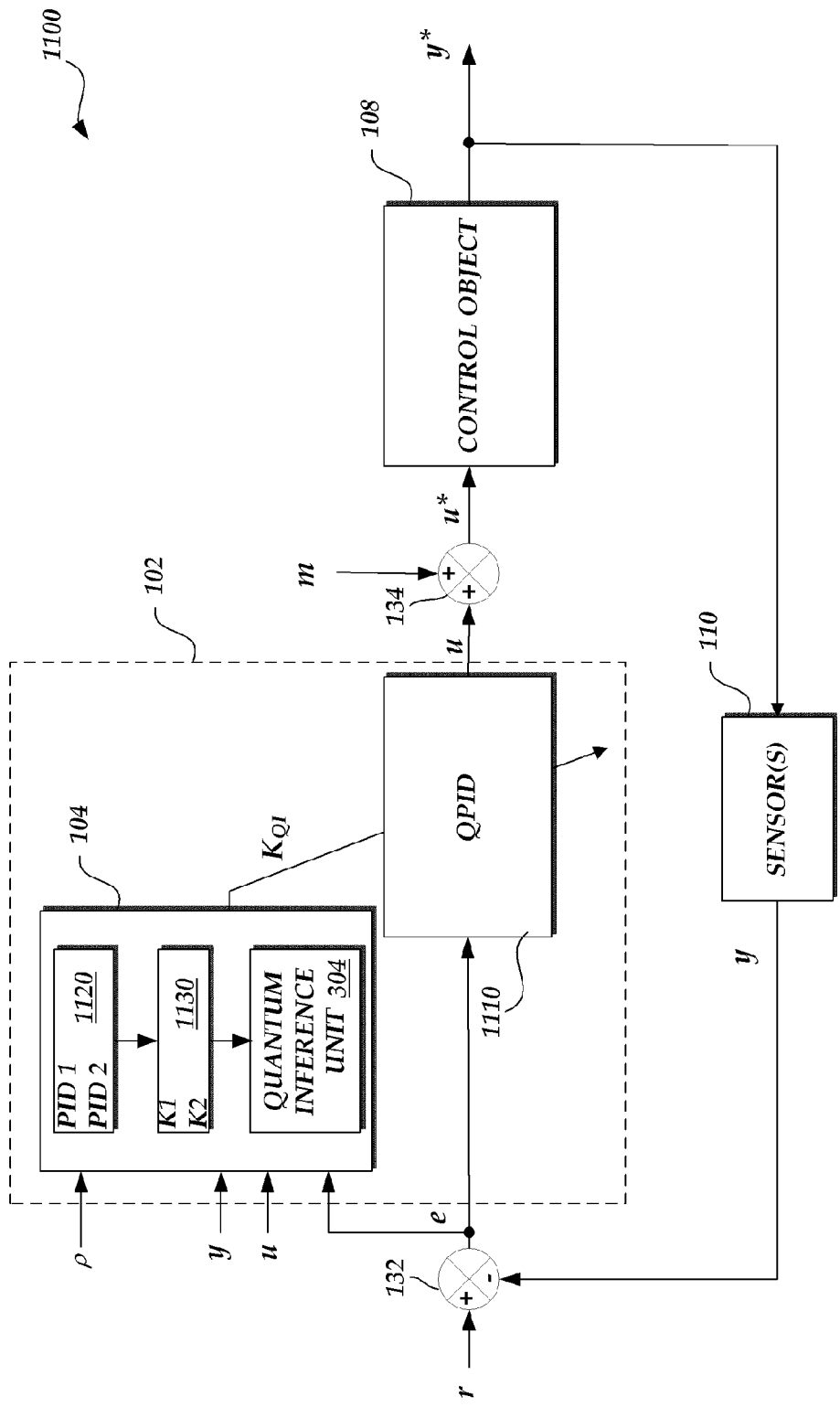
FIG. 11 is a block diagram depicting another illustrative control system including a self-organizing controller for controlling a control object according to an embodiment.

An example Quantum PID controller design based on quantum inference with two sets of classical PID gains $K^1$ and $K^2$ is shown in FIG. 11. Referring to FIG. 11, a block diagram depicting another illustrative control system 1100 including a self-organizing controller for controlling a control object will be described. In some applications, in which one or more PID controllers are used, the robustness of a control system, such as the control system 1100, can be increased using an intelligent quantum tuning unit 104 that includes a quantum inference unit 304. The intelligent quantum tuning unit 104 can include any combination of features of the intelligent quantum tuning units described herein. In some instances, a quantum PID (QPID) 1100 can be tuned online based on only two sets of PID controller gains $K^1$ and $K^2$. The controller gains 1130 can be generated by two non-robust PIDs 1120 and provided to the quantum inference unit 304 of the intelligent quantum tuning unit 104. The quantum inference unit 304 can tune the QPID 1110 based on the controller gains 1130, for example, using any combination of features of the quantum inference units described herein. Simulation results indicate that the quantum inference unit 304 can tune the QPID 1110 such that the QPID 1110 shows good robustness properties. For instance, the simulation results indicate QPID pole dynamic robust behavior. Accordingly, from two non-robust PIDs 1120, a robust QPID 1110 can be created. The QPID 1110 can have a synergistic effect on knowledge base quantum self-organization.

CONCLUSION

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "may," "might," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
selecting a correlation type based on a result of a quantum genetic search algorithm;
generating quantum states based on a plurality of controller parameters and the selected correlation type; and
tuning a controller configured to control a control object based on at least one of the generated quantum states.

2. The method of claim 1, wherein selecting comprises:
simulating a closed-loop system to evaluate a candidate correlation type;
evaluating a different candidate correlation type when the simulating indicates that fitness requirements are not satisfied; and
returning the candidate correlation type as the selected correlation type when the fitness requirements are satisfied.

3. The method of claim 1, wherein selecting is based on evaluating fitness functions associated with different correlation types.

4. The method of claim 1, wherein the correlation type comprises one of a spatial correlation, a temporal correlation, or a spatial-temporal correlation.

5. The method of claim 1, wherein the correlation type comprises an external correlation.

6. The method of claim 1, wherein the plurality of controller parameters comprise a set of controller gains.

7. The method of claim 6, wherein generating quantum states comprises:
generating a set of candidate quantum states based on the set of controller gains; and
performing a correlation of the selected correlation type on the set of candidate quantum states from which a selected quantum state of the candidate quantum states is identified.

8. The method of claim 7, further comprising identifying a quantum state having the highest probabilities of the candidate quantum states as the selected quantum state.

9. The method of claim 7, further comprising identifying the selected quantum state by performing Grover's search algorithm.

10. The method of claim 1, further comprising identifying one of the generated quantum states as a selected quantum state, wherein tuning is based on the selected quantum state.

11. The method of claim 1, wherein the quantum genetic search algorithm comprises Grover's search algorithm.

12. The method of claim 1, wherein the generated quantum states each comprise at least one real state and at least one virtual state.

13. The method of claim 1, wherein generating the quantum states provides at least one quantum state associated with a higher probability than any linear combination of the controller parameters.

14. The method of claim 1, wherein the controller parameters are based on at least one information risk production rule.

15. The method of claim 1, further comprising generating two sets of controller gains with one or more proportional-integral-derivative (PID) controllers, wherein the plurality of controller parameters include the two sets of controller gains, and wherein the controller comprises a quantum PID controller.

16. A control system comprising:
a quantum inference unit configured to provide one or more controller gains to a controller configured to control a control object, the quantum inference unit comprising:
a quantum correlator configured to generate a plurality of quantum states based on a plurality of controller parameters and a correlation type; and
a quantum optimizer configured to select the correlation type of the quantum correlator and to select a quantum state from the plurality of the quantum states,
wherein the one or more controller gains are based on the selected quantum state.

17. The control system of claim 16, further comprising a knowledge base storing at least one of the plurality of candidate controller parameters, the knowledge base configured to provide one or more of the plurality of candidate controller parameters to the quantum inference unit.

18. The control system of claim 17, wherein the knowledge base stores one or more information risk production rules.

19. The control system of claim 16, wherein the quantum inference unit further comprises a quantum encoder configured to generate a plurality of candidate quantum states based on the at least one of the plurality of controller parameters and provide the quantum correlator with the candidate quantum states, wherein the quantum correlator is configured to generate the plurality of quantum states based on performing a correlation of the selected correlation type on the candidate quantum states.

20. The control system of claim 16, wherein the quantum inference unit further comprises a decoder configured to output the one or more controller gains based on decoding the selected quantum state.

21. The control system of claim 16, wherein the quantum optimizer comprises a quantum search unit configured to perform a superposition operation, an entanglement operation, and an interference operation on the at least one of the plurality of quantum states generated by the quantum correlator.

22. The control system of claim 16, wherein the quantum optimizer comprises a genetic algorithm unit configured to simulate a closed-loop system and select the selected quantum state based on evaluating a fitness function associated with the selected correlation type.

23. The control system of claim 16, wherein the correlation type comprises one of a spatial correlation, a temporal correlation, or a spatial-temporal correlation.

24. The control system of claim 16, further comprising the controller.

25. The control system of claim 24, wherein the controller comprises a proportional-integral-derivative (PID) controller.

26. The control system of claim 25, wherein the controller comprises a fractional PID controller.

27. The control system of claim 25, wherein the controller comprises a quantum PID controller configured to tune the control object based, and wherein the plurality of controller parameters are based on two sets of gains generated by two PID controllers.

28. The control system of claim 24, wherein the controller comprises a sliding mode controller.

29. A method comprising:
generating quantum states based on a plurality of controller parameters;
executing a quantum search algorithm on the generated quantum states to select a quantum state based on information risk; and controlling a control object based on an indicator of the selected quantum state.

30. The method of claim 29, wherein executing is performed online.

31. The method of claim 29, further comprising adjusting at least one of the controller parameters based on an information risk production rule.

32. The method of claim 29, wherein the information risk is associated with a current state of a control system that includes the control object.

33. The method of claim 32, wherein the controller parameters are not designed to control the control object in the current state of the control system.

34. The method of claim 29, wherein executing comprises:
identifying the selected state when a risk termination condition is satisfied; and
generating new quantum states when the risk termination condition is not satisfied.

35. The method of claim 29, further comprising selecting a correlation type based on a result of performing another quantum search algorithm, wherein generating is based on the selected correlation type.

36. The method of claim 35, wherein selecting is based on evaluating fitness functions associated with different correlation types, wherein the fitness functions incorporate information risk.

37. The method of claim 29, wherein the quantum search algorithm is a quantum genetic search algorithm.

38. A control system comprising:
a quantum inference unit configured to provide one or more controller gains to a controller configured to control a control object, the quantum inference unit comprising:
a quantum correlator configured to generate a plurality of quantum states based on a plurality of controller parameters; and
a quantum optimizer configured to select a quantum state from the plurality of the quantum states based on information risk,
wherein the one or more controller gains are indicative of the selected quantum state.

39. The control system of claim 38, further comprising a knowledge base storing the controller parameters and one or more information risk production rules, the knowledge base configured to provide the one or more controller parameters to the quantum inference unit, wherein the information risk comprises the one or more information production rules.

40. The control system of claim 39, wherein the controller parameters comprise controller gains, and wherein the knowledge base is configured to compute the controller gains provided to the quantum inference unit based on a risk estimation signal indicative of information risk.

41. The control system of claim 38, wherein the quantum genetic optimizer comprises a genetic algorithm unit configured to simulate a closed-loop system and select the selected quantum state based on evaluating a fitness function that incorporates information risk.

42. The control system of claim 38, wherein the quantum inference unit further comprises a quantum encoder configured to generate a plurality of candidate quantum states based on the controller parameters and provide the quantum correlator with the candidate quantum states, wherein the quantum correlator is configured to generate the plurality of quantum states based on performing a correlation on the candidate quantum states.

43. The control system of claim 38, wherein the quantum inference unit further comprises a decoder configured to decode the one or more controller gains from the selected quantum state.

44. The control system of claim 38, further comprising the controller.

45. The control system of claim 44, wherein the controller comprises one of a proportional-integral-derivative (PID) controller, a fractional PID controller, and a sliding mode controller.

46. The control system of claim 38, wherein the quantum inference unit is a quantum fuzzy inference unit configured for providing one or more controller gains to a fuzzy controller.

* * * * *